(12) United States Patent
Saitoh

(10) Patent No.: US 6,414,781 B1
(45) Date of Patent: Jul. 2, 2002

(54) ELECTRO-OPTICAL DEVICE AND PROJECTION DISPLAY DEVICE INCLUDING THE SAME

(75) Inventor: Hiromi Saitoh, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/523,218

(22) Filed: Mar. 10, 2000

(30) Foreign Application Priority Data

| Mar. 30, 1999 | (JP) | ................................. | 11-090020 (P) |
| Mar. 30, 1999 | (JP) | ................................. | 11-090021 (P) |
| Mar. 10, 2000 | (JP) | ................................. | 2000-066565 |

(51) Int. Cl.$^7$ .............. G02F 1/03; G02F 1/00
(52) U.S. Cl. .............. 359/245; 359/246; 359/252; 359/253; 359/265; 359/273; 359/323; 349/42; 349/74; 349/149; 349/194
(58) Field of Search ............... 359/245, 246, 359/252, 253, 265, 270, 272, 273, 274, 275, 315, 319, 323; 349/42, 43, 110, 74, 149, 194, 138; 353/31, 34

(56) References Cited

U.S. PATENT DOCUMENTS

| 3,663,088 | A | * | 5/1972 | Maldonado et al. | ........ 359/252 |
| 5,097,358 | A | * | 3/1992 | Ito et al. | ..................... 359/273 |
| 5,206,756 | A | * | 4/1993 | Cheshire | ..................... 359/265 |
| 5,216,536 | A | * | 6/1993 | Agrawal et al. | ............ 359/265 |
| 5,442,478 | A | * | 8/1995 | Lampert et al. | ............ 359/273 |
| 5,822,107 | A | * | 10/1998 | Lefrou et al. | ................ 359/273 |
| 6,172,730 | B1 | * | 1/2001 | Fujita | ......................... 349/149 |

* cited by examiner

Primary Examiner—Loha Ben
(74) Attorney, Agent, or Firm—Oliff & Berridge, PLC

(57) ABSTRACT

An electro-optical device is provided having a structure which, in particular, allows the device to be made smaller and thinner, and the heat-dissipation capability to be increased in order to prevent overheating. A positioning section which accommodates an opposing substrate, and which contacts an edge of an element substrate is provided in a case member accommodating an electro-optical panel which consists of the opposing substrate and the element substrate.

52 Claims, 11 Drawing Sheets

(a)

(b)

RELATED ART

ELECTRO-OPTICAL DEVICE AND PROJECTION DISPLAY DEVICE INCLUDING THE SAME

BACKGROUND OF THE INVENTION

1. Field of the Invention

The present invention relates to an electro-optical device and a projection display device including the same.

2. Description of the Related Art

In general, a liquid crystal panel used in a projection display device, such as a liquid crystal projector, is mounted to the inside of a housing of the projection display device, with the liquid crystal panel being accommodated in a case member formed of, for example, synthetic resin. Usually, a flexible wiring substrate is connected to the liquid crystal panel. With the flexible wiring substrate being connected, the liquid crystal panel is installed and positioned in the case member in order to affix it to the case member with, for example, an adhesive or a holding fixture, after which a mounting hole or the like formed in the case member is positioned at a mounting portion formed inside the projection display device and secured thereto by a method such as screwing.

A liquid crystal panel module used as an electro-optical device including the above-described liquid crystal panel and case member is used as a light valve for forming a predetermined image as a result of receiving light from a light source in the projection display device. The image formed by the liquid crystal panel module is enlarged by a projection optical system of the projection display device, and the enlarged image is projected onto, for example, a screen.

FIG. 1 is an exploded perspective view of a conventional liquid crystal panel module, while FIG. 2 is a schematic view showing in section the general structure of the conventional liquid crystal panel module. The liquid crystal panel module may consist of a liquid crystal panel 10 and a case member 20 for accommodating the liquid crystal panel 10 therein. In order to form the liquid crystal panel 10, an element substrate 11 and an opposing substrate 12, both of which are formed of glass or the like, are placed with a predetermined space formed therebetween in order to bond them together with a sealant 14. After the bonding of the substrates 11 and 12, liquid crystals 10a are injected between the substrates. The case member 20 is formed of, for example, synthetic resin, which is black or any other color possessing light-shielding capability.

In the liquid crystal panel 10, an active element such as a known TFT (thin-film transistor) element, a pixel electrode formed of a transparent electrical conductor such as an ITO (indium tin oxide) conductor, wiring, an alignment layer, etc., are formed on the inside surface of the element substrate 11. A known opposing electrode, an alignment layer, etc., are formed on the inside surface of the opposing substrate 12. Thus, an active matrix type liquid crystal panel structure is formed. A light-shielding layer 12a serving as a frame defining a light-transmissive area (or an effective display area) of the liquid crystal panel 10 is formed at an outer peripheral portion of the inside surface of the opposing substrate 12.

In the projection display device, the liquid crystal panel module is irradiated with gathered and concentrated light, and the light is either transmitted or blocked by a plurality of pixels formed in the effective display area of the liquid crystal panel in order to form a predetermined image. Each pixel is controlled by an electric field applied as a result of an electrical potential difference between the pixel electrode and the opposing electrode. Here, when there are any scratch defects or dust on the outside surface of either the element substrate 11 or the opposing substrate 12 of the liquid crystal panel 10, the scratch defects or dust disturb the image, resulting in the problem that the quality of the projected image is reduced. Since the image formed by the liquid crystal panel 10 is enlarged and projected, this problem is particularly serious, so that the aforementioned scratch defects or dust considerably adversely affect the image.

In order to overcome this problem, a method in which transparent substrates 1 and 2 are adhered to outside surfaces of the element substrate 11 and the opposing substrate 12 of the liquid crystal panel 10, respectively, has, hitherto, been developed. The transparent substrates 1 and 2 are adhered to the element substrate 11 and the opposing substrate 12, respectively, with a transparent adhesive which is not shown. For the transparent adhesive, it is preferable to use a material whose refractive index is approximately equal to those of the element substrate 11 and the opposing substrate 12 and those of the transparent substrates 1 and 2. Examples of the transparent adhesive are silicone adhesive and acrylic adhesive, which are transparent after hardening. Accordingly, by adhering the transparent substrates 1 and 2 to the outside surfaces of the element substrate 11 and opposing substrate 12 using a transparent adhesive, the quality of the image is not affected even if there are any scratch defects on the outside surfaces of the element substrate 11 and the opposing substrate 12, and dust is prevented from sticking onto the outside surfaces of the element substrate 11 and the opposing substrate 12. Although scratch defects may be formed or dust may stick onto the outside surfaces of the transparent substrates 1 and 2, the focus of light radiated from the light source is usually set so as to be situated in the liquid crystal panel 10, so that, due to a defocusing effect, the image quality is virtually unaffected.

The case member 20 includes a hole 20a which extends through the top and bottom thereof so as to accommodate the liquid crystal panel 10. The hole 20a includes open sections 20b and 20c formed at both the front and back sides of the accommodated liquid crystal panel 10. An inwardly protruding edge 21 is formed at an edge of the open section 20c so as to engage the outside surface of the transparent substrate 2 accommodated in the hole 20a. A holding frame 24, which is stopped by an engaging protrusion 23 formed at the outside surface of the case member 20, is mounted at the open section 20b in order to hold the outside surface of the transparent substrate 1 accommodated in the hole 20a. A step 22 is formed at the middle of the hole 20a in accordance with the outside shape of portions of the element substrate 11 protruding outwardly of the opposing substrate 12 of the liquid crystal panel 10.

In assembling the liquid crystal panel module, after adhering the transparent substrates 1 and 2 to the front and back sides of the liquid crystal panel 10, an adhesive whose main component is, for example, silicone rubber is applied to the protruding portions of the element substrate 11 and the inside of the case member 20, and, from the open section 20b in the case member 20, the liquid crystal panel 10 and the transparent substrates 1 and 2 are placed into the case member 20. At this time, in the direction in which the liquid crystal panel 10 and the transparent substrates 1 and 2 are placed (that is, the thickness direction of the panel), the liquid crystal panel 10 and the transparent substrates 1 and 2 are positioned as a result of bringing the outside surface of the transparent substrate 2 and the protruding edge 21 into contact with each other. In the direction of extension of a surface of the liquid crystal panel 10, they are positioned as a result of bringing an end of the opposing substrate 12 and the inside surface defining the hole 20a into contact with each other. Lastly, the holding frame 24 is fitted to the engaging protrusion 23 in order to hold the panel assembly so that it does not get dislodged from the open section 20b, and then the adhesive is allowed to harden in order to form an integral structure.

In a projection display device including the above-described conventional liquid crystal panel module, due to restrictions on the structure of the device or depending on whether or not measures against dust need to be taken or the quality of an image needs to be improved, the liquid crystal panel module may be constructed by adhering either one or neither one of the transparent substrates 1 and 2. However, the above-described case member 20 is constructed so as to position and hold in its interior the panel assembly in which the transparent substrates 1 and 2 are adhered to the liquid crystal panel 10. Therefore, in the case where the transparent substrate 2 is not adhered to the liquid crystal panel 10, the protruding edge 21 can no longer be used as a positioning and holding member, which means that the case member 20 can no longer be used as a positioning and holding member. In addition, light leakage may occur due to the formation of gaps. Therefore, it is necessary to make available a case member every time a differently structured liquid crystal panel module is used. Further, for example, the shape of the case member is changed depending on whether or not the structure of a panel assembly includes a transparent substrate, making it necessary to form the mounting section disposed in the projection display device in correspondence with the shape of the case member. This results in the problems of increased manufacturing costs and complicated product control.

The conventional case member 20 is constructed so as to hold the outside surface of the transparent substrate 2 in the thickness direction thereof by the protruding edge 21 formed at the open section 20c, causing the case member 20 to be thicker than the panel assembly, resulting in the problem that a large space is required to place the liquid crystal panel module in the projection display device.

In the projection display device, overheating tends to occur because the liquid crystal panel module is irradiated with intense light from the light source, making it necessary to efficiently cool the liquid crystal panel module in order to prevent malfunctioning thereof caused by the liquid crystals getting hotter. However, in the liquid crystal panel module made thick by adhering the transparent substrates 1 and 2 and forming the protruding edge 21 on the case member 20, it is difficult to increase heat-dissipation efficiency, so that the strength of a cooling fan used to forcingly cool the liquid crystal panel module needs to be large, making it difficult to reduce noise during operation.

SUMMARY OF THE INVENTION

In order to overcome the above-described problems, it is an object of the present invention to provide an electro-optical device comprising an electro-optical panel accommodated in a case member, wherein, by forming the case member so that it has a different structure, the case member does not need to be changed depending on whether or not a transparent substrate is bonded in the structure of the panel, the case member can be made thinner than the conventional case member, and the heat-dissipation capability is increased.

According to the present invention, there is provided an electro-optical device which may consist of:
  an electro-optical panel including an opposing substrate and an element substrate having a larger area than the opposing substrate; and
  a case member including an open section at the opposing substrate side and another open section at the element substrate side, the case member accommodating the electro-optical panel from the open section at the element substrate,
  wherein, between the open section at the opposing substrate side and the open section at the element substrate side, the case member includes a positioning section which accommodates the opposing substrate and contacts an edge of the element substrate.

In this invention, the positioning section is formed at the accommodating section for accommodating the electro-optical panel in the case member, so that a protruding edge for positioning the electro-optical panel at an edge of the case member, which is required in a conventional device, is no longer required. Therefore, the case member can be formed thinner. In addition, since the protruding edge is not required, the heat-dissipation capability of the electro-optical panel can be increased. Further, in order to reduce optical effects resulting from scratch defects and dust, a flat transparent substrate or a transparent member, such as a small lens, a polarizer, or other such optical members may be disposed on a surface of the electro-optical panel. Here, the positioning section is disposed at the accommodating section, so that, regardless of whether or not a transparent member is accommodated, the positioning of the electro-optical panel is not affected. In addition, it is not necessary to change the case member regardless of, for example, whether or not a transparent member is used or the types of other members used, so that the same case member can be used in common with various types of products. Consequently, it is possible to flexibly and quickly respond to demands, to reduce manufacturing costs, and to easily control the manufacturing process.

It is preferable that the positioning section positions the electro-optical panel in at least the thickness direction thereof. The positioning section may be formed so as to position the electro-optical panel in a direction of extension of a surface of the panel, or to position it in both the thickness direction thereof and the direction of extension of the surface of the panel. The electro-optical panel is not limited to a liquid crystal panel described later, so that, for example, an EL (electro-luminescence) panel or an organic EL panel may also be used.

In the present invention, it is preferable that the open section at the opposing substrate side and the open section at the element substrate side in the case member be capable of receiving corresponding transparent members.

In this case, it is not necessary to form positioning sections for positioning the electro-optical panel at the pair of open sections at the sides of the accommodating section including the positioning section, making it possible to form the transparent substrates and other parts which are accommodated in the pair of open sections to the same dimensions, thereby reducing manufacturing costs and facilitating parts control.

In the electro-optical device of the present invention, a light-shielding member may be disposed on at least one of the opposing substrate and the element substrate. The light-shielding member is provided outside the display area of the electro-optical panel.

According to this structure, when, in particular, a transparent member is not used, the light-shielding section is disposed at the outer peripheral portion of the electro-optical panel, so that light trying to enter from the outer periphery of the electro-optical panel is blocked, making it possible to prevent reduced contrast and malfunctioning of the electro-optical panel caused by the entrance of light.

The light-shielding member may be formed to include a light-transmissive section at an area corresponding to the display section. In such a structure, the display surface includes a transparent section, making it possible to prevent dust from sticking onto and scratches from being formed on the display surface.

A stepped section may be formed at the open section at the element substrate side in the case member.

According to this structure, when the transparent member is joined to the element substrate, the element substrate and the transparent member can be positioned by the positioning section and the stepped section.

A gap may be formed between the inside surface of the case which may consist of positioning section and the stepped section and a periphery of a portion where the element substrate and the transparent member are joined together.

According to this structure, even when any adhesive overflows from the portion where the element substrate and the transparent member are joined together, the overflowing adhesive can be accumulated in the gap, so that the adhesive is prevented from flowing out the case member.

According to the present invention, there is provided an electro-optical device which may consist of:
- an electro-optical panel including an opposing substrate and an element substrate having a larger area than the opposing substrate; and
- a case member including an open section at the opposing substrate side, another open section at the element substrate side, and an opening for inserting the electro-optical panel in a direction perpendicular to the open sections,
- wherein, between the open section at the opposing substrate side and the open section at the element substrate side, the case member includes a positioning section which accommodates the opposing substrate and contacts an edge of the element substrate.

According to this structure, regardless of the sizes of the open sections at the opposing substrate side and the element substrate side, it is possible to accommodate the electro-optical panel from the opening.

According to the present invention, there is provided an electro-optical device which may consist of:
- an electro-optical panel including an opposing substrate, an element substrate having a larger area than the opposing substrate, and a transparent member which is joined to the opposing substrate and which has a larger area than the opposing substrate; and
- a case member including an open section at the opposing substrate side and another open section at the element substrate side,
- wherein, between the open section at the opposing substrate side and the open section at the element substrate side, the case member includes a protruding section sandwiched by an edge of the element substrate and an edge of the transparent member.

According to this structure, it is possible to position the electro-optical panel by the protruding section.

According to the present invention, there is provided an electro-optical device which may consist of:
- an electro-optical panel including an opposing substrate, an element substrate, and a transparent member which is joined to the opposing substrate and which has a smaller area than the opposing substrate; and
- a case member including an open section at the opposing substrate side and another open section at the element substrate side,
- wherein, between the open section at the opposing substrate side and the open section at the element substrate side, the case member includes a positioning section which contacts an edge of the opposing substrate.

According to this structure, when the transparent member having a smaller area than the opposing substrate is joined to the opposing substrate, it is possible to position the electro-optical panel using the opposing substrate.

According to the present invention, there is provided an electro-optical device comprising:
- an electro-optical panel including an opposing substrate, an element substrate, and a transparent member which is joined to at least one of the opposing substrate and the element substrate and which is at least partly formed of monocrystalline sapphire; and
- a case member including an open section at the opposing substrate side and another open section at the element substrate side,
- wherein the case member includes a positioning section which accommodates the electro-optical panel and contacts an edge of the electro-optical panel.

According to this structure, by forming at least a portion of the transparent member with monocrystalline sapphire having a very high thermal transmittance ratio, which is at least 20 to 30 times greater than those of various types of glass, the thermal transmittance ratio of the transparent substrate is increased, thereby increasing the heat-dissipation capability of the electro-optical panel and reducing the temperature distribution within a surface of the electro-optical panel. Therefore, it is possible to reduce deterioration caused by overheating and temperature distribution, and limit increases in, for example, energy consumption and noise by increased cooling of a cooling device. Compared to the hardness of various types of glass, the Vickers hardness of monocrystalline sapphire is two to four times greater, so that the outer side portions of the transparent substrate can be made harder. Therefore, it is possible to prevent the surface of the transparent substrate from getting scratched, and the transparent substrate from breaking and cracking. In addition, compared to, for example, glass, monocrystalline sapphire has a higher refractive index, so that even when the transparent substrate is formed thin, a defocusing effect can be obtained.

It is desirable that a projection display device is constructed so as to include any one of the above-described electro-optical device of the present invention as an image-forming, device. By virtue of this structure, an electro-optical device with good heat-dissipation capability can be realized, and, for example, the strength of the cooling fan can be reduced, so that a compact projection display device in which electrical power consumption is reduced can be constructed.

DETAILED DESCRIPTION OF THE EMBODIMENTS

Figure 1:
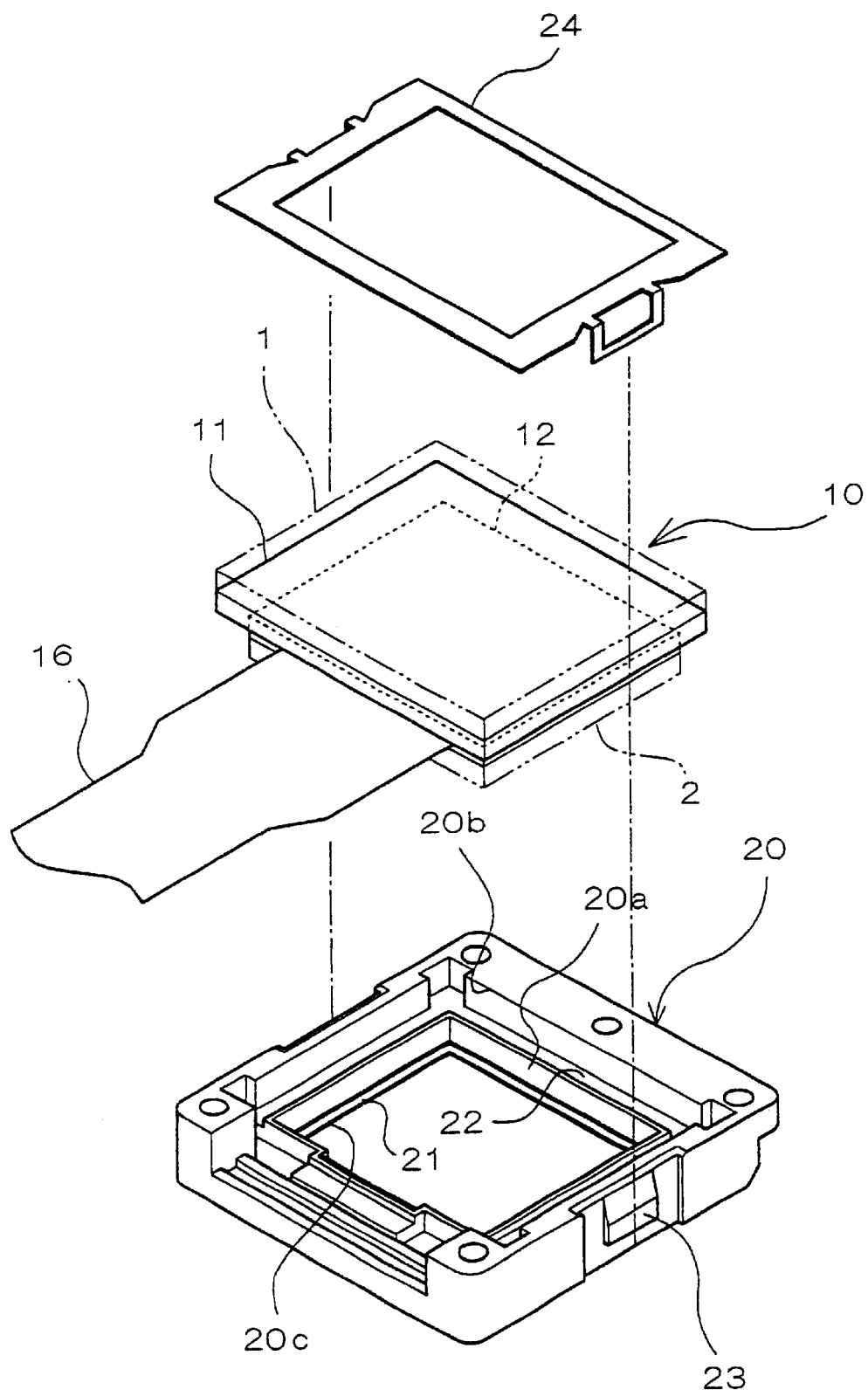
FIG. 1 is an exploded perspective view showing the general structure of a conventional liquid crystal panel module.

Hereunder, a description of embodiments of the electro-optical device and projection display device including the same will be given in detail. The electro-optical device of each of the embodiments described below includes the conventionally structured liquid crystal panel 10 of FIG. 1 used as an electro-optical panel, so that the basic structure thereof is essentially the same as the conventional structure. The present invention is not limited to a liquid crystal panel, so that various other electro-optical panels such as an EL (electro-luminescence) panel and an organic EL panel may also be used.

First Embodiment

Figure 3:
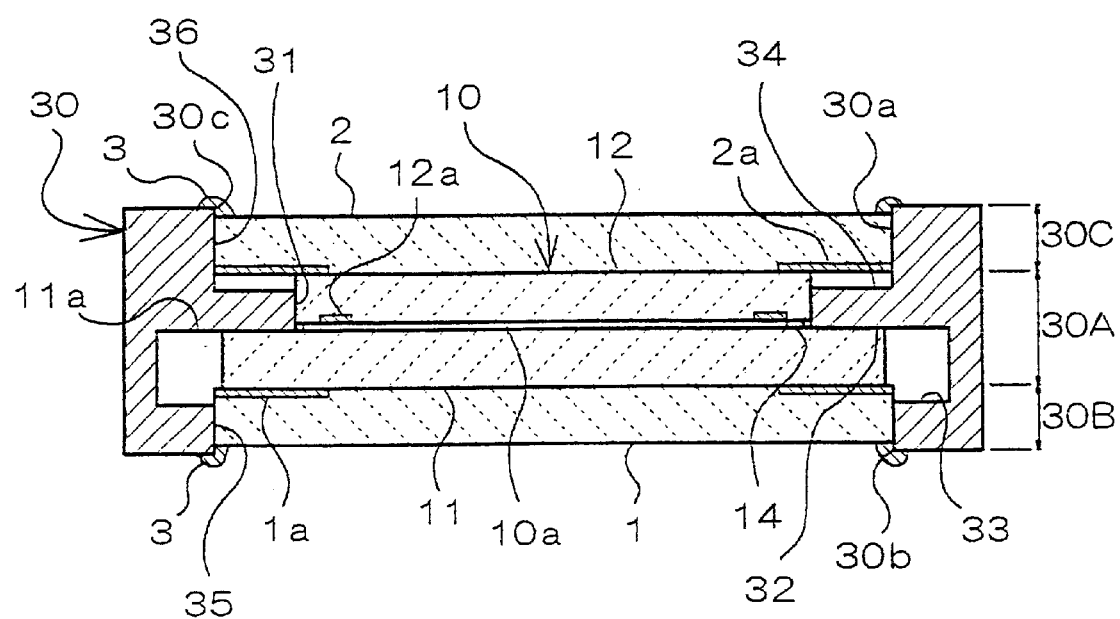
FIG. 3 is a sectional view schematically showing the general structure of a first embodiment of the electro-optical device in accordance with the present invention.

FIG. 3 is a sectional view schematically showing the general structure of a first embodiment of the electro-optical device in accordance with the present invention. An integrally molded case member 30 formed of black synthetic resin having light-shielding capability is formed into the shape of a rectangular frame in plan view. A hole 30a which is rectangular in plan view is formed so as to extend through the front and back sides of the case member 30 in order to accommodate a liquid crystal panel 10 in substantially the center thereof in the thickness direction of the panel, with the liquid crystal panel 10 being formed by bonding together an element substrate 11 and an opposing substrate 12. The hole 30a includes an open section 30b formed at the element substrate 11 side and an open section 30c formed at the opposing substrate 12 side.

To make it easier to describe the embodiment below, the hole 30a will be described as forming imaginary spaces, that is, an accommodating section 30A disposed at about the center of the hole 30a in an axial direction thereof, an outer accommodating section 30B disposed adjacent to the accommodating section 30A and at a side surface formed at the open section 30b side, and an outer accommodating section 30C disposed adjacent to the accommodating section 30A and at a side surface formed at the open section 30c side.

The liquid crystal panel 10 is accommodated in the accommodating section 30A of the case member 30, and an inside surface 31 disposed in the accommodating section 30A is made to contact an end surface of the opposing substrate 12 in order to position the liquid crystal panel 10 in a direction of extension of a surface of the panel (that is, a direction parallel to the surface of the panel). A stepped surface 32 formed adjacent to the inside surface 31 and parallel to the direction of extension of the surface of the panel is provided in the accommodating section 30A. The stepped surface 32 is brought into contact with an inside surface of a protruding section 11a of the element substrate 11 protruding outwardly of the opposing substrate 12 in order to position the liquid crystal panel 10 in the thickness direction thereof.

When wiring, terminals, etc., are formed on a surface opposing the protruding section 11a of the element substrate 11, they may be covered by a hard protective film (such as an overcoat film), and the stepped surface 32 may be made to contact the protective film. When a COG (chip-on-glass) structure in which electronic parts such as an integrated circuit are mounted onto the surface opposing the protruding section 11a of the element substrate 11 is used, the stepped surface 32 is formed away from the electronic parts. For example, it is desirable that the stepped surface 32 be formed at portions of the case member 30 so as to contact equal to or more than three of the four corners of the liquid crystal panel 10.

A stepped surface 33 opposing the stepped surface 32 is formed in the outer accommodating section 30B formed at the open section 30b side of the accommodating section 30A, and a flat inside surface 35 extending parallel to the thickness direction of the panel is formed further outward from the stepped surface 33 (that is, at the open section 30b side). An outside edge of the inside surface 35 corresponds to an edge defining the open section 30b. More specifically, the inside surface 35 is formed inside the case member 30 while substantially maintaining the shape of the open section 30b, that is, the entire outside accommodating section 30B is approximately the same shape as the open section 30b in plan view.

Since the size of a gap between the stepped surfaces 32 and 33 opposing each other is slightly larger than the thickness of the element substrate 11, the stepped surface 33 is formed slightly closer to the open section 30b than the portion where the element substrate 11a and the transparent substrate 1 are joined together.

A stepped surface 34 and a flat inside surface 36 are formed in the outer accommodating section 30C formed at the open section 30c side of the accommodating section 30A. The stepped surface 34 is formed opposite the stepped surface 32 with the inside surface 31 being formed therebetween, and the inside surface 36 is formed further outward from the stepped surface 34 (that is, at the open section 30c side) so as to be parallel to the thickness direction of the panel. An outside edge of the inside surface 36 corresponds to an edge defining the open section 30c. More specifically, the inside surface 36 is formed at the inside of the case member 30 while substantially maintaining the shape of the open section 30c, that is, the entire outside accommodating section 30C is approximately the same shape as the open section 30c in plan view.

Since the size of the separation between the stepped surfaces 32 and 34 disposed opposite each other is slightly smaller than the sum of the thicknesses of the opposing substrate 12 and the gap in the panel (that is, the gap between the element substrate 11a and the opposing substrate 12), the stepped surface 34 is formed slightly closer to the open section 30b than the portion where the opposing substrate 12 and the transparent substrate 2 are joined together.

Accordingly, since the stepped surface 33 is displaced from the portion where the element substrate 11a and the transparent substrate 1 are joined together, and the stepped surface 34 is displaced from the portion where the opposing substrate 12 and the transparent substrate 2 are joined together, gaps are formed between the case member 30 and the portion where the element substrate 11a and the transparent substrate 1 are joined together and between the case member 30 and the portion where the opposing substrate 12 and the transparent substrate 2 are joined together. These gaps serve as spaces for accommodating any transparent adhesive overflowing towards the outer side when the element substrate 11a and the transparent substrate 1 and the opposing substrate 12 and the transparent substrate 2 are bonded together with the transparent adhesive, so that they make it possible to prevent the transparent adhesive from overflowing out from the case member 30, or to reduce the amount of transparent adhesive overflowing towards the outer side of the case member 30.

Since the stepped surfaces 33 and 34 are formed between the accommodating section 30A and the outer accommodating section 30B, the ends of the element substrate 11a and transparent substrate 1, and the ends of the opposing substrate 12 and transparent substrate 2 can be accommodated so that they are not aligned in the direction of extension of the surface of the panel. Accordingly, steps are formed by the ends of the element substrate 11a and transparent substrate 1 and by the ends of the opposing substrate 12 and transparent substrate 2. Since these steps are formed, even if any transparent adhesive overflows from either the portion where the element substrate 11a and the transparent substrate 1 are joined together or the portion where the opposing substrate 12 and the transparent substrate 2 are joined together, as long as the amount of overflowing transparent adhesive is small, the transparent adhesive accumulates on the corresponding step due to its own wettability and surface tension in relation to the materials of which the substrates are formed. Therefore, the overflowing transparent adhesive does not come into contact with the inside of the case member 30, making it possible to prevent any transparent adhesive from leaking out from the case member 30. Obviously, if the amount of overflowing transparent adhesive is large, it does not stop flowing at the steps. However, in such a case, since gaps are formed between the panel assembly and the inside surface of the case member 30 by the steps 33 and 34 of the case member 30, the transparent adhesive is prevented from leaking out from the case member 30 by these gaps.

The case member 30 is constructed so as to allow the transparent substrates 1 and 2 to be placed into the outer accommodating sections 30B and 30C from the respective open sections 30b and 30c. In other words, since the flat inside surfaces 35 and 36 are formed parallel to the thickness direction of the panel at the inner sides of the open sections 30b and 30c, respectively, if the transparent substrates 1 and 2 are formed with shapes and sizes that allow them to be placed in the case member 30 from the respective open sections 30b and 30c, they can be bonded to the liquid crystal panel 10 as they are placed in the case member 30. Therefore, when the transparent substrates 1 and 2 are not needed, all that needs to be done is to place the liquid crystal panel 10 into the case member 30, without placing the transparent substrates 1 and 2 therein. If at least one of the transparent substrates 1 and 2 needs to be used, after placing the liquid crystal panel 10 into the case member 30, at least one of the transparent substrates 1 and 2 is placed into the case member 30 from its corresponding open section 30b or 30c, and bonded to the outside surface of its corresponding element substrate 11 or opposing substrate 12 with a transparent adhesive. Consequently, regardless of whether or not a transparent substrate needs to be used, the steps of assembling the liquid crystal panel module can be changed and carried out by using the same case member 30 and, when necessary, omitting or adding steps from or to the assembly procedure in accordance with whether or not a transparent substrate needs to be used.

In the embodiment, the open sections 30b and 30c are formed with the same shape and size, and the transparent substrates 1 and 2 are composed of glass plates with the same size and shape. Therefore, it is possible to make it easier to control the step of handling transparent substrates, and to reduce costs.

Since the liquid crystal panel 10 is positioned in the case member 30 by the inside surface 31 and the stepped surface 32 in the direction of extension of the surface of the panel and the thickness direction of the panel, respectively, if the liquid crystal panel 10 and the case member 30 are further affixed with, for example, an adhesive disposed in, for example, a groove between the stepped surfaces 32 and 33, the liquid crystal panel 10 is affixed to the case member 30 while it is positioned therein. Adhesives which are resilient after hardening, such as rubber adhesives including silicone RTV, may be used for the aforementioned adhesive. In this case, the liquid crystal panel 10 is bonded to the case member 30 with a certain flexibility.

Figure 2:
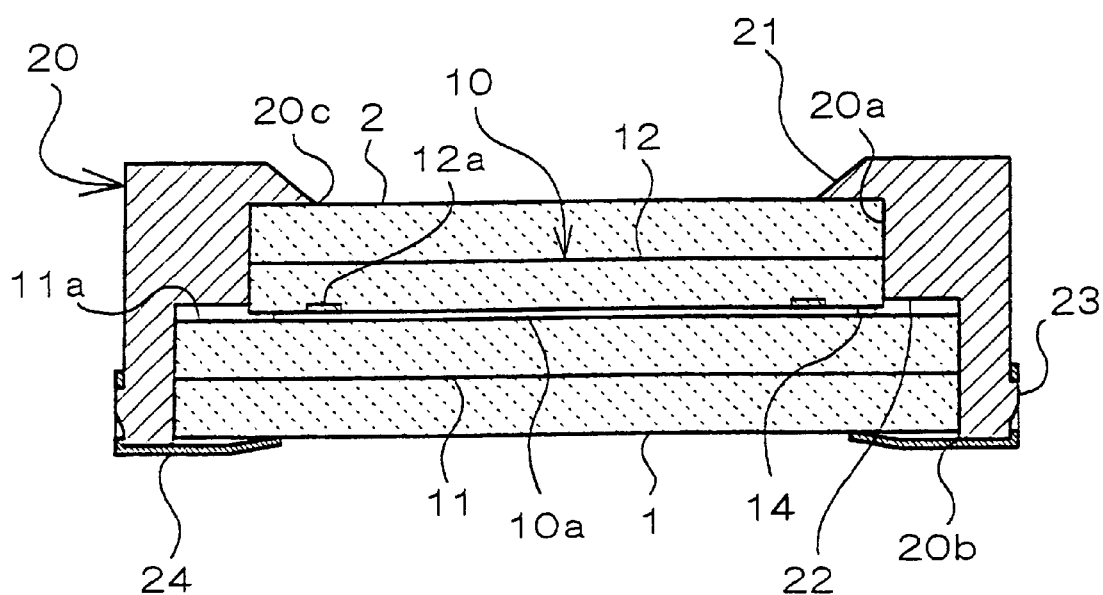
FIG. 2 is a sectional view schematically showing the general structure of the conventional liquid crystal panel module.

Accordingly, by affixing the liquid crystal panel 10 to the case member 30, and by placing the transparent substrates 1 and 2 from the respective open sections 30b and 30c in order to bond them to the liquid crystal panel 10, the panel assembly consisting of the liquid crystal panel 10 and the transparent substrates 1 and 2 are affixed as a whole to the case member 30. In the conventional supporting member 20 shown in FIG. 2, the liquid crystal panel 10 and the transparent substrates are positioned in the thickness direction of the panel by the protruding edge 21 formed as an edge defining the open section 20c, making the case member 20 inevitably thicker than the panel assembly. In contrast, in the embodiment, they are positioned by the stepped surface 32 formed in the accommodating section 30A. Therefore, the protruding edge 21 for stopping the outside surface of a transparent substrate, which is required in the conventional electro-optical device, is not required in this embodiment. As a result, the case member 30 can be formed thinner. In addition, due to the same reason, it is no longer necessary to form a portion which includes the protruding edge 21 formed at the outer side of the transparent substrate 2, and the open area of the open section 30c can be increased, making it possible to increase heat-dissipation capability.

It is preferable that light-shielding layers 1a and 2a be formed on the outer peripheral portions of the transparent substrates 1 and 2. The light-shielding layers 1a and 2a can be formed by depositing, for example, aluminum, or by printing a pigmented layer, such as a black layer. From the point of view of protecting the transparent substrates from stray light, it is preferable to form the light-shielding layers 1a and 2a on the inner sides (or the surfaces opposing the liquid crystal panel 10) of the respective transparent substrates 1 and 2. If the light-shielding layers 1a and 2a are formed so that the light-shielding layer 12a formed in the liquid crystal panel 10 is aligned with inside edges thereof in plan view, it is possible to prevent leakage of light.

In order to completely shield the transparent substrates 1 and 2, the liquid crystal panel 10, and the case member 30 from light, it is preferable to apply a light-shielding material 3, such as black resin, between the peripheral edge of the transparent substrate 1 and the edge defining the open section 30b in the case member 30 and between the peripheral edge of the transparent substrate 2 and the edge defining the open section 30c in the case member 30, and let it harden. The light-shielding material 3 may be applied to the edge defining either one of the open sections 30b and 30c.

(Structure of the Projection Display Device)

Figure 13:
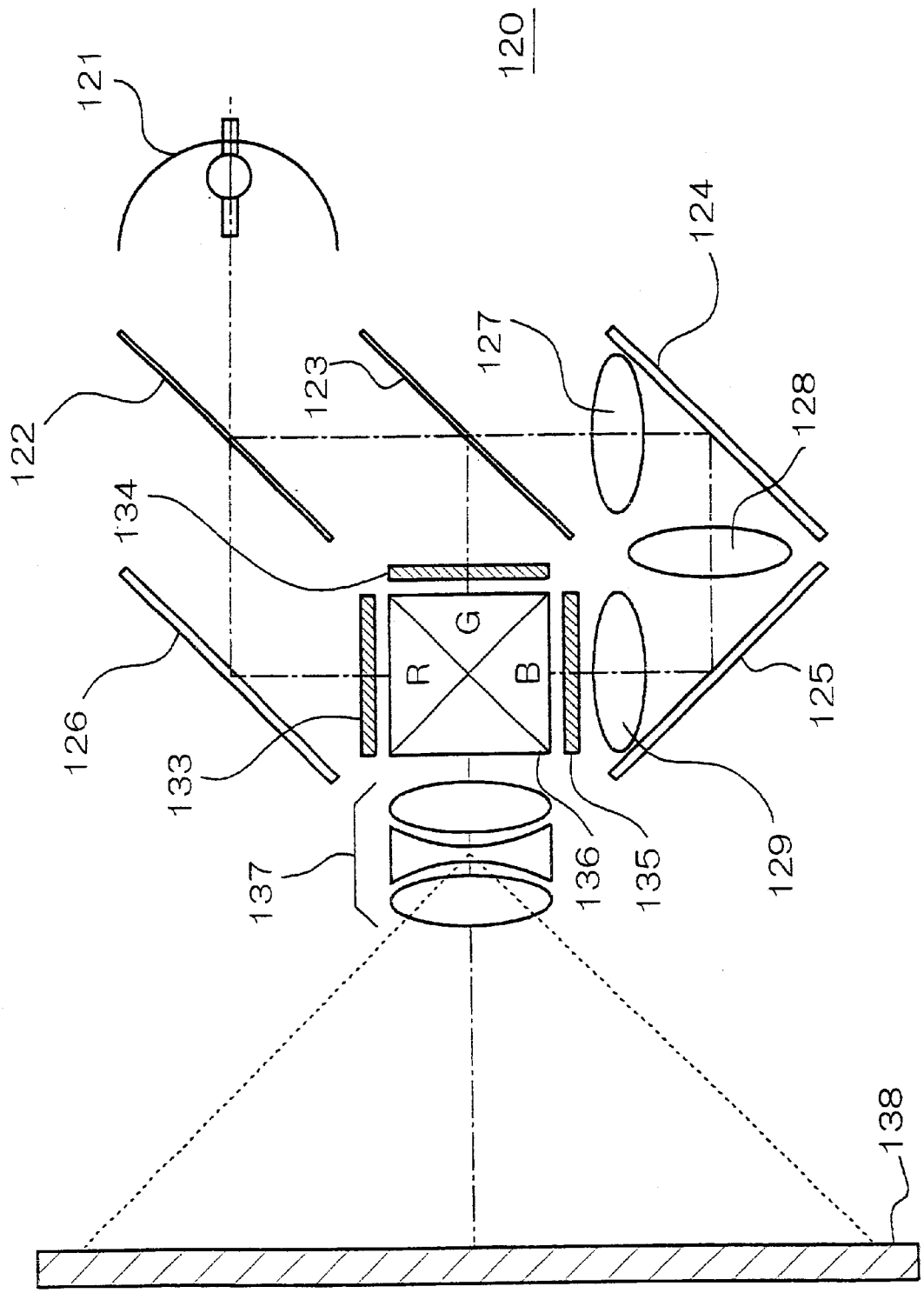
FIG. 13 is a schematic view showing the general structure of a projection display device including the electro-optical devices in accordance with the present invention.

The liquid crystal panel module of the embodiment is designed to be installed inside a projection display device shown in FIG. 13. Referring to FIG. 13, the structure of a liquid crystal projector 120 used as a projection display device including the above-described liquid crystal panel module will be described. A lamp 121, serving as a light source, two dichroic mirrors 122 and 123, and three reflective mirrors 124, 125, and 126 are installed in a housing of the liquid crystal projector 120. Lamps which may be used include a halogen lamp, a metal halide lamp, and a xenon lamp. Light emitted from the light source is separated into R (red), G (green), and B (blue) light beams by the dichroic mirrors 122 and 123. In the device, three liquid crystal light valves 133, 134, and 135 are disposed so as to surround a cubic dichroic prism 136 from three directions. The reflective mirrors 124, 125, and 126 are such as to lead the R light, G light, and B light to the liquid crystal light valves 133, 134, and 135, respectively. In order to eliminate the problem of loss of B (blue) light caused by its long optical path, the B light is led through a light-incident lens 127, a relay lens 128, and a light-exiting lens 129.

The above-described liquid crystal panel module is used to form each of the liquid crystal light valves 133, 134, and 135, and the case member 30 is installed by inserting it and securing it to a mounting portion which is not shown disposed in an optical unit. The liquid crystal light valves are controlled by a controlling driving system which is not shown in accordance with desired image information in order to modulate each of the R, G, and B light beams.

The R, G, and B light beams which have been modulated by their corresponding liquid crystal light valves 133, 134, and 135 in order to form predetermined image components are synthesized by the cubic dichroic prism 136, after which the resulting synthesized light beams are enlarged and projected by a projection lens unit 137 onto a predetermined location of a screen 138.

In the above-described liquid crystal projector 120, when the structure used in the embodiment is made thinner, the above-described liquid crystal light valves can also be made thinner, so that the entire device can be reduced in size. In addition, as mentioned above, by enhancing the heat-dissipation capability of the liquid crystal panel module, it is possible to decrease the strength of a cooling fan used for forced cooling in the projection display device having the liquid crystal panel modules installed therein, making it possible to reduce noise.

Second Embodiment

A description of a second embodiment will now be given with reference to FIG. 4. The structure used in the second embodiment is the same as that used in the first embodiment except that the transparent substrate 2 is not installed. Therefore, only the differences will be discussed below. The liquid crystal panel module of the second embodiment may consist of a liquid crystal panel 10 and a case member 30 which are the same type as those used in the liquid crystal panel module of the first embodiment. Therefore, corresponding parts are given the same reference numerals, and are not described below. In this embodiment, the transparent substrate 2 used in the first embodiment is not adhered to the outside surface of an opposing substrate 12 of the liquid crystal panel 10. Instead, a light-shielding sheet 4 with a light-shielding layer 4a formed on only a peripheral edge of a transparent resin base material is bonded to the outside surface of the opposing substrate 12 in the case member 30. A light-shielding material 3 which is the same type as that used in the liquid crystal panel module of the first embodiment is bonded between the peripheral edge of the light-shielding sheet 4 and an inside surface 36 of a case member 30.

Figure 4:
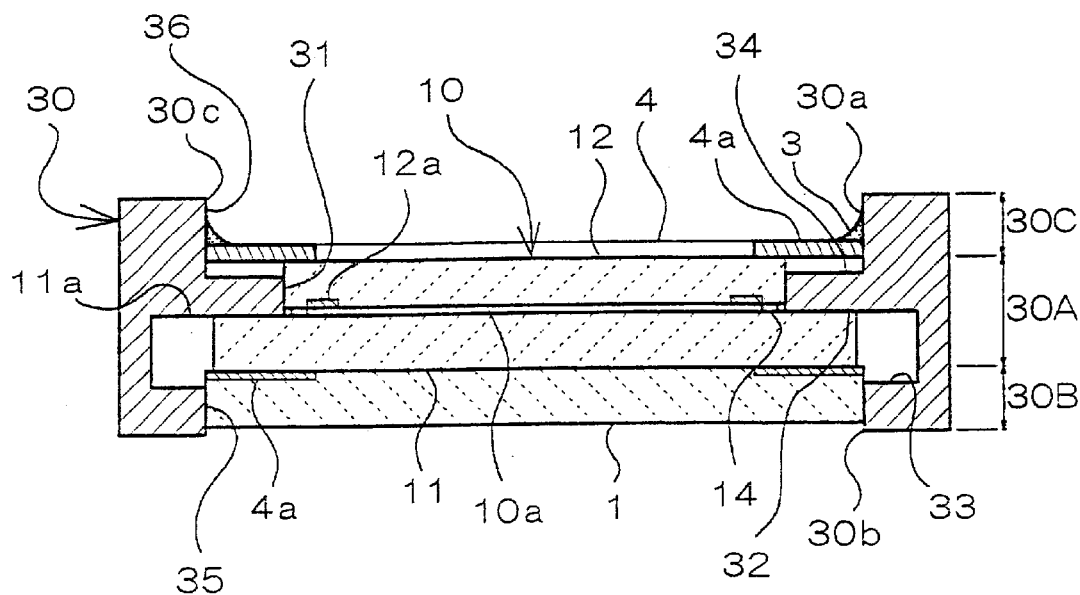
FIG. 4 is a sectional view schematically showing the general structure of a second embodiment of the electro-optical device in accordance with the present invention.

As shown in FIG. 4, the light-shielding sheet 4 may be formed with a size which allows it to be almost exactly fitted in an outer accommodating section 30C of the case member 30 so that the peripheral edge of the light-shielding sheet 4 is formed with a size which allows it to contact the inside surface 36; or it may be formed with a size approximately equal to the size of the outside surface of the opposing substrate 12 so that the space between the outer side thereof and the inside surface 36 is filled with the light-shielding material 3.

Third Embodiment

Figure 5:
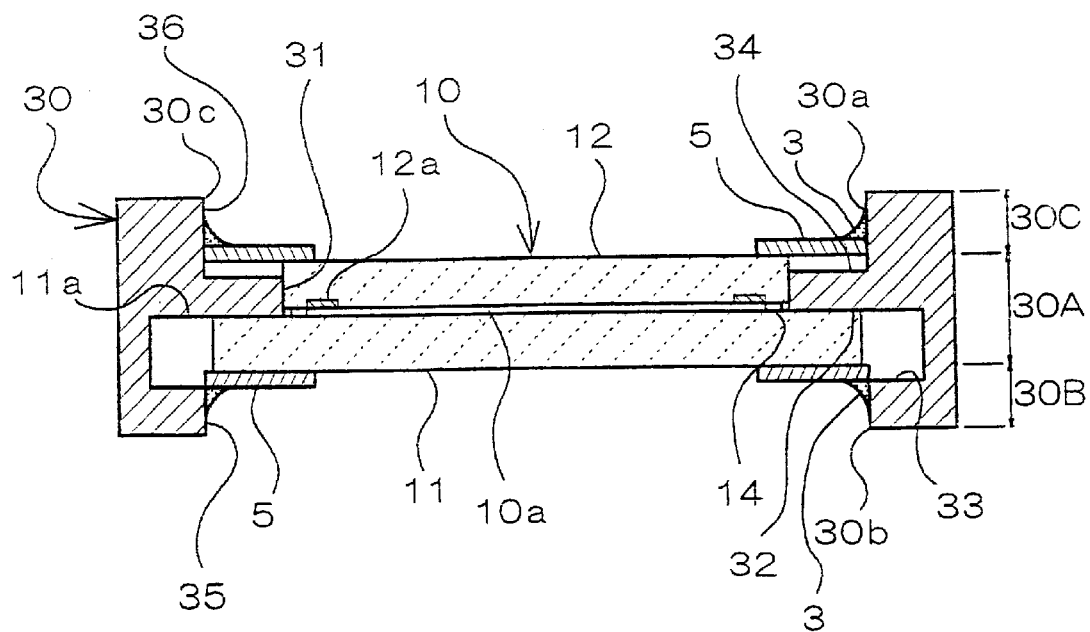
FIG. 5 is a sectional view schematically showing the general structure of a third embodiment of the electro-optical device in accordance with the present invention.

A description of a third embodiment will now be given with reference to FIG. 5. The structure used in the third embodiment is the same as that used in the first embodiment except that the transparent substrates 1 and 2 are not installed. Therefore, only the differences will be discussed. The liquid crystal panel module of this embodiment may consist of a liquid crystal panel 10 and a case member 30 which are of the same type as the liquid crystal panel module used in the first embodiment. Corresponding parts are given the same reference numerals, and are not described below. Here, after placing the liquid crystal panel 10 in a case member 30, a light-shielding frame member 5, instead of the light-shielding sheet 4 used in the second embodiment, is adhered to the outside surface of an opposing substrate 12. In addition, another light-shielding frame member 5 is adhered to the outside surface of the element substrate 11. Thereafter, as in the second embodiment, a light-shielding material 3 is bonded between the peripheral edges of the light-shielding frame members 5 and the case member 30.

Although, in the structure used in the second embodiment, the transparent base material of the light-shielding sheet 4 is formed on the display surface of the panel, the light-shielding frame members 5 are only formed on the outer periphery of the display surface of the panel in the structure used in the third embodiment. The light-shielding sheet 4 prevents scratch defects from being formed on or dust from sticking onto the display surface of the panel and is suitable for realizing defocusing. Since there is nothing which blocks the display surface of the panel, the light-shielding frame members 5 can function to prevent the transmittance ratio from being reduced, and to position the transparent substrates when affixing them as described later using FIG. 8.

Although a light-shielding sheet 4 is used in the second embodiment, and light-shielding frames 5 are used in the third embodiment, they may be selectively used as required in accordance with the required characteristics of the product.

In the embodiment, regardless of whether or not transparent substrates 1 and 2 are bonded to the liquid crystal panel 10, the same case member 30 can be used in common, so that it is not necessary to make available various types of case member 30, making it possible to reduce manufacturing costs and to facilitate parts control. In particular, when the liquid crystal panel 10 alone is previously accommodated in the case member 30, and, then, the transparent substrates 1 and 2 are placed into the case member 30 from the open sections 30b and 30c in order to bond them, the manufacturing steps up to the step of accommodating the liquid crystal panel 10 into the case member 30 are the same in all of the embodiments illustrated in FIGS. 3 to 5, so that the manufacturing process does not become complicated.

In the embodiment, polarizers are not adhered to the liquid crystal panel module. They are installed at the projection display device side including the liquid crystal panel modules. However, polarizers may be installed at the liquid crystal panel module. In this case, the polarizers may be directly affixed to the surfaces of the liquid crystal panel 10. However, they may also be easily affixed to the outside surfaces of the transparent substrates 1 and 2 after completion of the assembly of the liquid crystal panel module because the case member 30 is constructed as described above. Although no problems arise even when at least one of the transparent substrates 1 and 2 is not installed as described later, if at least one of the transparent substrates 1 and 2 is not installed, polarizers may be directly affixed to the surfaces of the panel after the accommodation of the liquid crystal panel in the case members 30.

In one embodiment, the transparent substrates 1 and 2 are accommodated in the outer accommodating sections 30B and 30C. However, transparent substrates 1 and 2 may not be used at all. In the latter case, as mentioned above, polarizers may or may not be affixed to the outside surfaces of the liquid crystal panel 10 used in the liquid crystal panel module. Even in the case where polarizers are not accommodated in the outer accommodating sections, the advantages resulting from the use of the same case member can be obtained.

Members other than those described above which are accommodated in the outer accommodating sections include a micro-lens array, a color filter, a reflection prevention plate, and an optical phase plate.

Fourth Embodiment

A description of a fourth embodiment of the present invention will be given with reference to FIG. 6. The liquid crystal panel module of this embodiment includes a case member 40 having almost the same structure as the case member 30 used in the first embodiment. The structure of the outer surface portion thereof is different only, so that structural features which are the same will not be discussed.

Two pairs of engaging protrusions 43 and 45 are formed on the outside surface of the case member 40, light-shielding holding frames 44 are mounted to the pair of engaging protrusions 43 formed at an open section 40b, and an inner edge 44a of each holding frame 44 protrudes into the open section 40b. Similarly, light-shielding holding frames 46 are mounted to the pair of engaging protrusions 45 formed at an open section 40c, and an inner edge 46a of each holding frame 46 protrudes into the open section 40c.

Figure 6:
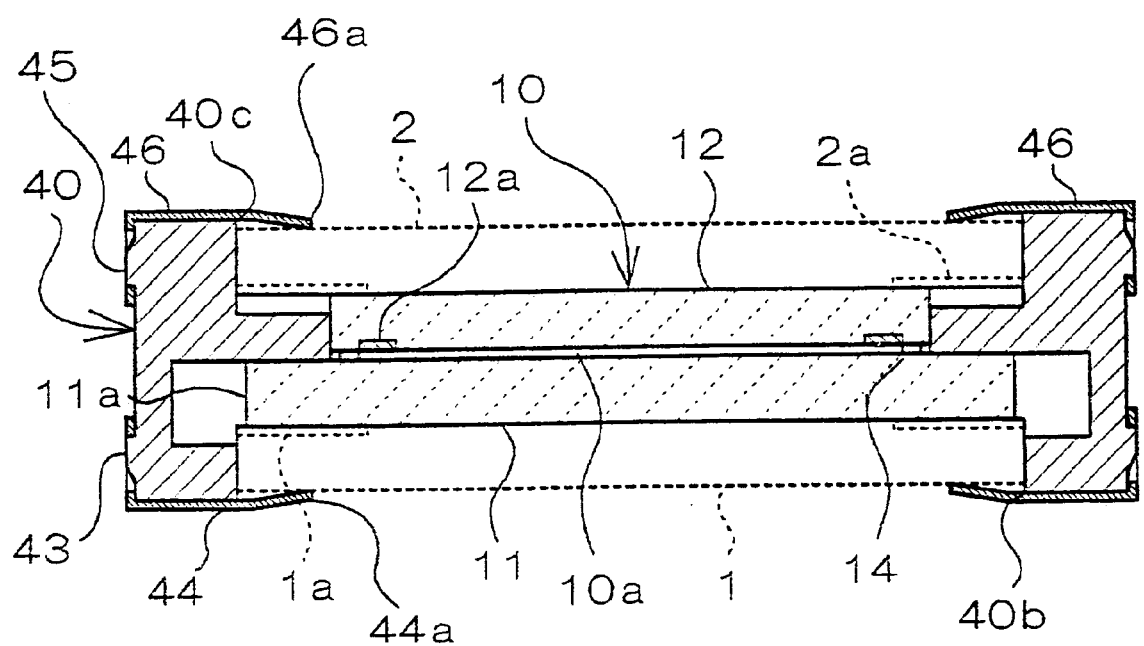
FIG. 6 is a sectional view schematically showing the general structure of a fourth embodiment of the electro-optical device in accordance with the present invention.

In the embodiment, since the holding frames 44 and 46 are constructed so as to be mountable at their corresponding open sections 40b and 40c, when transparent substrates 1 and 2 are, as shown by the dotted lines in FIG. 6, accommodated in the case member 40 along with the liquid crystal panel 10, the outside surfaces of the transparent substrates 1 and 2 can be held thereby. Therefore, they can function to temporarily hold the transparent substrates 1 and 2 until the transparent adhesive is hardened by, for example, heating after bonding the transparent substrates 1 and 2 to the outside surfaces of the liquid crystal panel 10 with the transparent adhesive. In addition, since the holding frames 44 and 46 are formed of light-shielding material, they can be used as a light-shielding device in place of the light-shielding layers 1a and 2a formed on the transparent substrates 1 and 2 and the light-shielding material 3 in such cases as when light-shielding layers 1a and 2a are not formed on the transparent substrates 1 and 2, when the light-shielding material 3 is not applied, or when transparent substrates 1 and 2, themselves, are not accommodated in the case members 40. The holding frames 44 and 46 may be constructed so they only incorporate a light-shielding function, in which case they are not constructed so as to be capable of holding the transparent substrates 1 and 2 and the liquid crystal panel 10. In contrast to this, they may be constructed so that they are only capable of holding the transparent substrates 1 and 2 and the liquid crystal panel 10, in which case they do not incorporate a light-shielding function.

Fifth Embodiment

Figure 7:
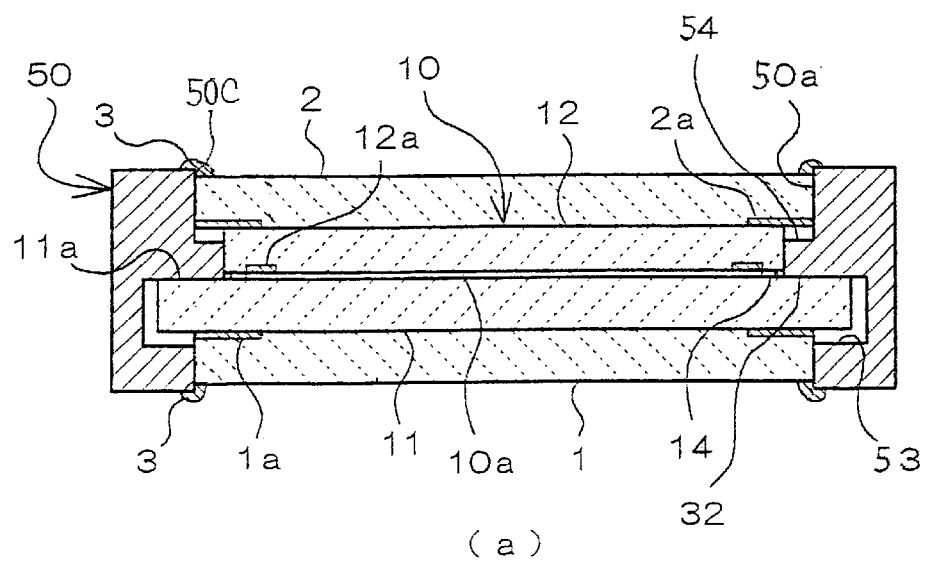
FIG. 7(a) is a sectional view schematically showing the general structure of a fifth embodiment of the electro-optical device in accordance with the present invention.
FIG. 7(b) is a plan view schematically showing the general structure of the fifth embodiment.
Figure 7:
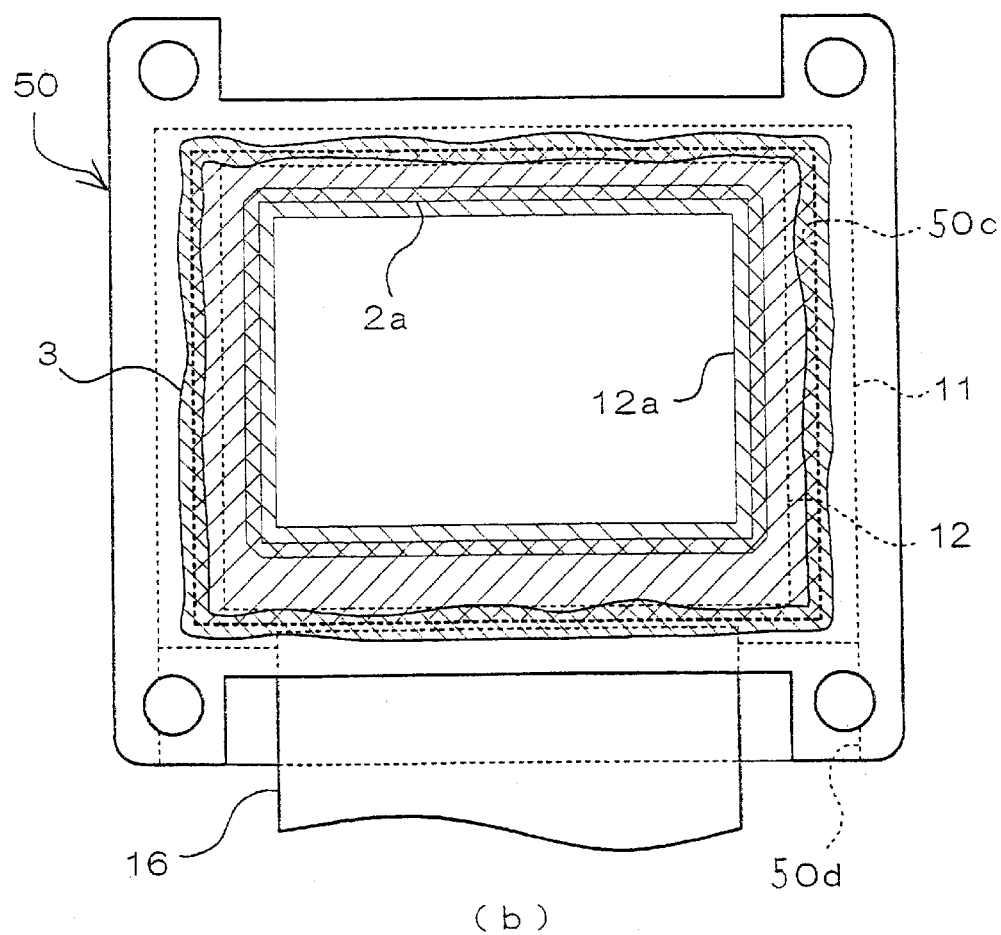

A description of a fifth embodiment of the present invention will be given with reference to a FIGS. 7(a)–(b). FIG. 7(a) is a sectional view schematically showing the general structure of the fifth embodiment of the liquid crystal panel module, while FIG. 7(b) is a schematic plan view thereof. The structure used in the fifth embodiment is similar to that used in the first embodiment illustrated in FIG. 3. Corresponding parts are given the same reference numerals, and will not be described below. Only the differences will be discussed. In the structure used in this embodiment, transparent substrates 1 and 2 whose surfaces are adhered to a liquid crystal panel 10 are formed smaller than an element substrate 11 of the liquid crystal panel 10 in order to use less material in forming the transparent substrates 1 and 2, thereby reducing manufacturing costs. In this embodiment, an open section 50d which opens downward in FIG. 7(b) is formed in a hole 50a in a case member 50, and the liquid crystal panel 10 can be inserted from the open section 50d by sliding it in a direction of extension of a surface of the liquid crystal panel 10. With a flexible wiring substrate 16 shown in FIG. 7(b) being connected, the liquid crystal panel 10 is placed in from the open section 50d in order to affix it to the case member 50 with an adhesive described later.

In the embodiment, an engaging protrusion 53 is formed on the outside surface of the case member 50. As in the second embodiment, by mounting a holding frame 54 to the engaging protrusion 53, the holding frame 54 functions to temporarily hold the panel assembly and to shield it against light. As in the first embodiment, the engaging protrusion 53 and holding frame 54 do not have to be formed. In addition, as in the second embodiment, the holding frame may be formed so as to be mountable at the open section 50c.

Sixth Embodiment

Figure 8:
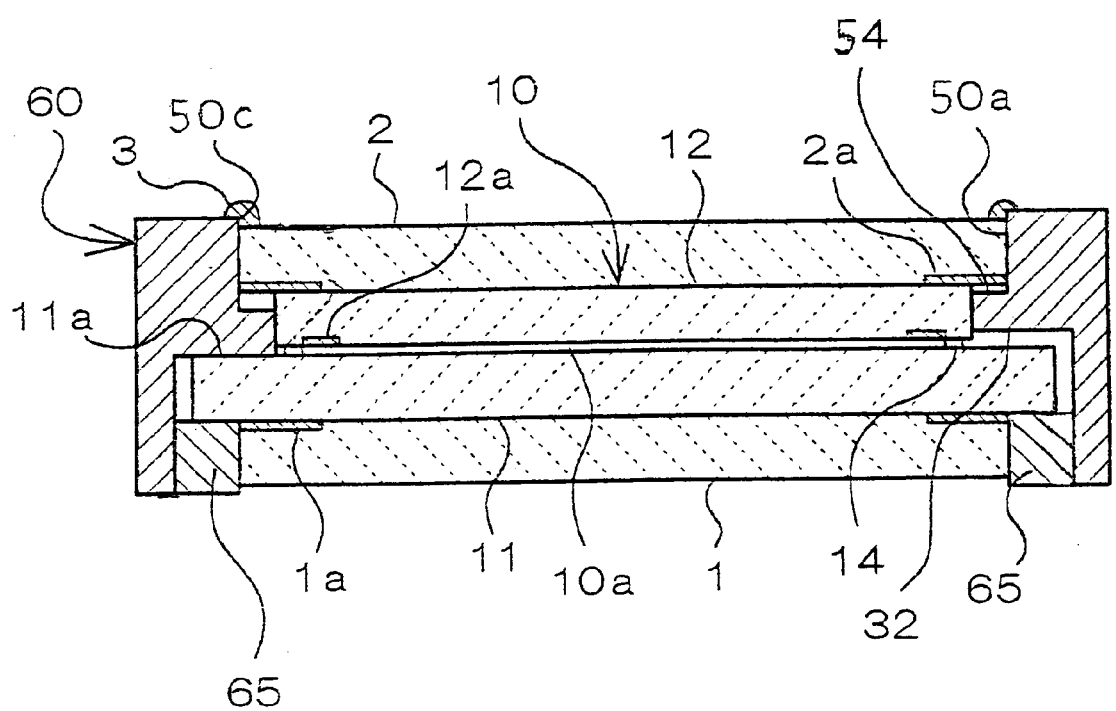
FIG. 8 is a sectional view schematically showing the general structure of a sixth embodiment of the electro-optical device in accordance with the present invention.

A description of a sixth embodiment of the present invention will be given with reference to FIG. 8. FIG. 8 is a sectional view schematically showing the general structure of the sixth embodiment of the liquid crystal panel module. The structure used in this embodiment is similar to the structures used in the first and fifth embodiments. Corresponding parts are given the same reference numerals, and are not described below. Only the differences will be discussed. In the structure used in this embodiment, transparent substrates 1 and 2 whose surfaces are adhered to a liquid crystal panel 10 are formed smaller than an element substrate 11 of the liquid crystal panel 10 in order use less material in forming the transparent substrates 1 and 2, thereby reducing manufacturing costs. This structural feature is the same as that described in the fifth embodiment. The sixth embodiment differs from the fifth embodiment in that a frame member 65 is provided to position the transparent substrate 1.

In this embodiment, the liquid crystal panel 10 can be inserted without sliding it, and the transparent substrate 1 can be positioned. By making the frame member 65 incorporate a light-shielding function, and appropriately selecting the size of the frame, it can also be made to function as the light-shielding frame member 5 previously described in the third embodiment, so that it can be used in a structure where a transparent substrate 1 is not bonded.

Seventh Embodiment

Figure 9:
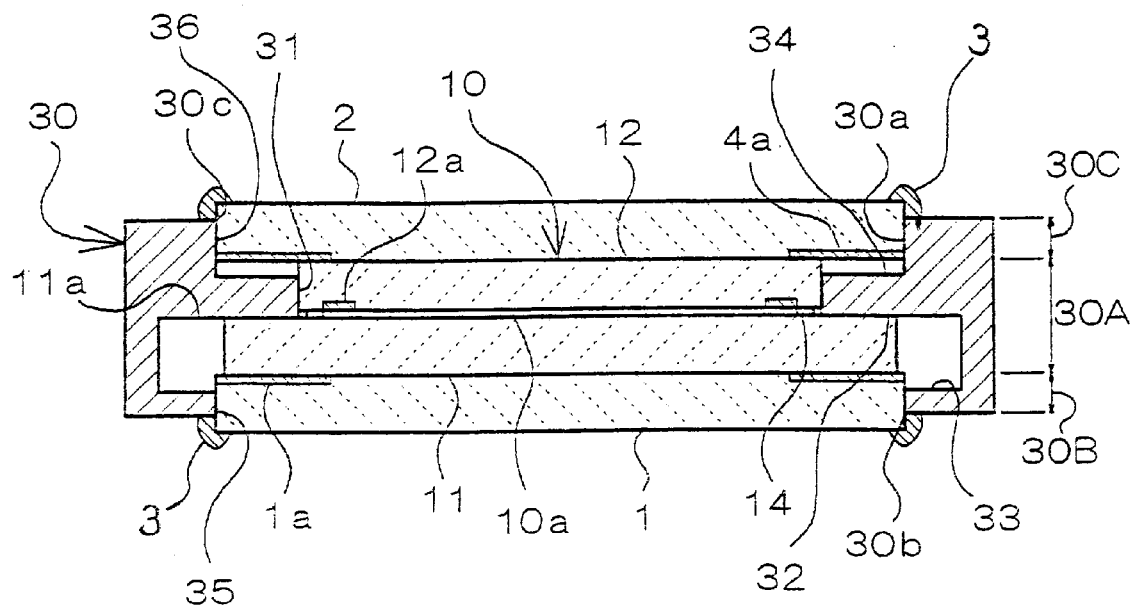
FIG. 9 is a sectional view schematically showing the structure of a seventh embodiment of the electro-optical device in accordance with the present invention.

FIG. 9 is a sectional view schematically showing the general structure of a seventh embodiment of the liquid crystal panel module being an electro-optical device in accordance with the present invention. The structure used in this embodiment is similar to that used in the first embodiment, so that corresponding parts will not be described below.

In the embodiment, an end of a case member 30 in the thickness direction of an electrical liquid crystal panel, that is, the outside surface of a transparent substrate 1 is disposed so as to protrude from an edge of an open section 30b in the case member 30. Similarly, the other end in the thickness direction, that is, the outside surface of a transparent substrate 2 is disposed so as to protrude from an edge of an open section 30c of the case member 30.

Therefore, the case member 30 can be formed thinner than a conventional case member. The entire thickness of the liquid crystal panel module is not determined by the thickness of the case member 30, but rather by the thickness of the panel assembly consisting of the liquid crystal panel 10 and the transparent substrates 1 and 2.

An adhesive 3 is applied as a light-shielding material to peripheral edges of the transparent substrates 1 and 2 protruding from the case member 30. This makes it possible to prevent external light from entering from the peripheral edges of the transparent substrates 1 and 2. A light-shielding adhesive may be applied between the inside surface of the case member 30 and the inside surfaces of the transparent substrates 1 and 2.

Eighth Embodiment

Figure 10:
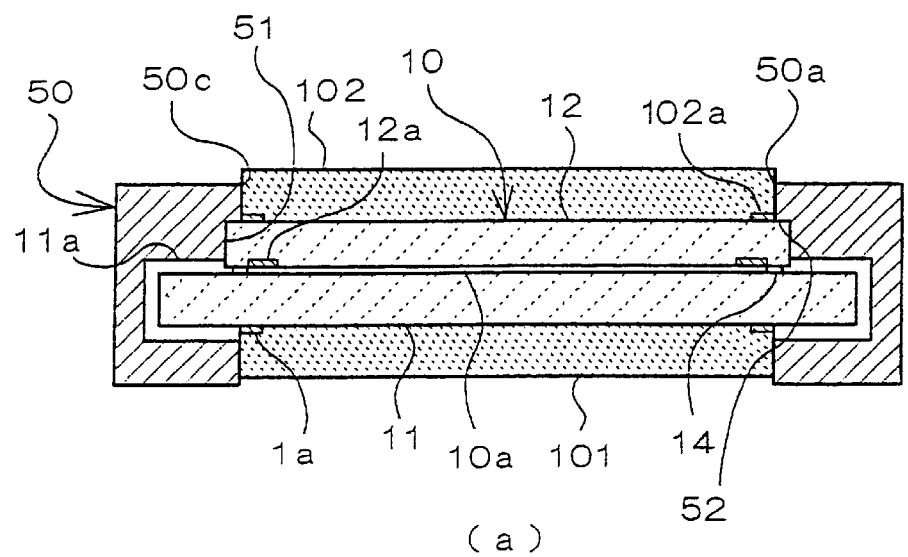
FIG. 10(a) is a sectional view schematically showing the structure of an eighth embodiment of the electro-optical device in accordance with the present invention.
FIG. 10(b) is a schematic plan view thereof.
Figure 10:
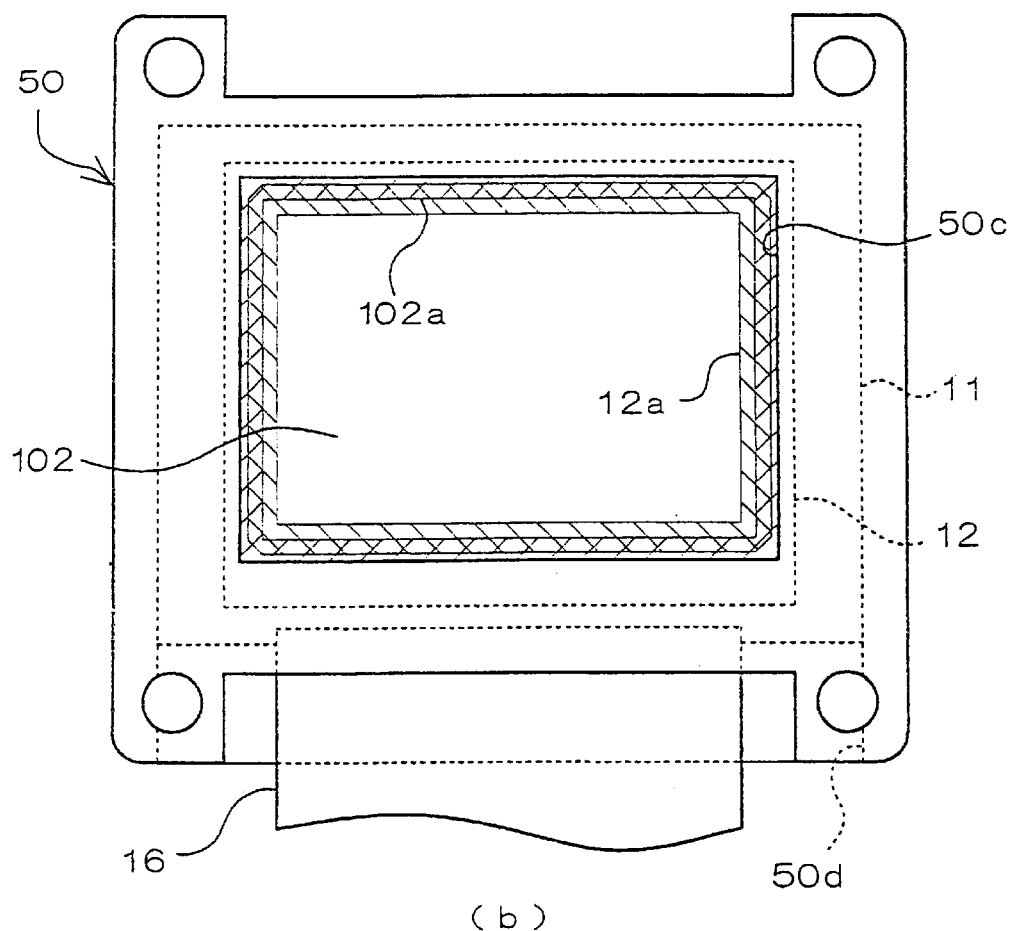

A description of an eighth embodiment of the present invention will be given with reference to FIGS. 10(a)–(b). FIG. 10(a) is a sectional view schematically showing the general structure of the eighth embodiment of the liquid crystal panel module, while FIG. 10(b) is a schematic plan view thereof. The structure used in this embodiment is similar to that used in the seventh embodiment. Corresponding component parts are given the same reference numerals, and are not described below. Only the differences will be discussed. In the structure used in this embodiment, transparent substrates 101 and 102 whose surfaces are adhered to a liquid crystal panel 10 are formed even smaller than an opposing substrate 12 of the liquid crystal panel 10 in order to reduce the amount of monocrystalline sapphire used, thereby reducing manufacturing costs.

Monocrystalline sapphire (having a Vickers hardness of 2300) is considerably harder than glass, even quartz glass which is particularly strong (with a Vickers hardness of 900). Therefore, even when the transparent substrates 101 and 102 are formed thinner than a conventional transparent substrate, they can be made to flow during the manufacturing process, making it possible to reduce the risk of breakage. For example, when the transparent substrates 101 and 102 are formed into the shape of a plate with a vertical length in an order of 200 mm and a horizontal length in an order of 300 mm, they can be formed with plate thicknesses in an order of 0.2 mm, so that they can be easily handled during the manufacturing process. Because the transparent substrates 101 and 102 are very hard, breakage or cracking of the transparent substrates 101 and 102 occurs less frequently during or after the manufacturing process, so that they are easy to handle, and made more resistant to shock. In addition, since they are hard, a case member 50, itself, can be formed thinner by forming the transparent substrates 101 and 102 thinner, making it possible to form the entire liquid crystal module thinner. Here, by forming the transparent substrates 101 and 102 thinner than a conventional transparent substrate, the amount of monocrystalline sapphire used can be reduced, making it possible to reduce manufacturing costs.

Further, since, as described above, the transparent substrates 101 and 102 are very hard, scratch defects are not easily formed on the outside surfaces of the transparent substrates 101 and 102, making it possible to eliminate the problem of reduced image quality caused by these scratch defects. Essentially, due to the defocusing effect, scratch defects on the outside surfaces of the transparent substrates 101 and 102 do not often affect the image quality, but it is advantageous not to have any scratch defects in order to enhance image quality. In addition to being very hard, monocrystalline sapphire has a high refractive index ($n_o$= 1.768, $n_e$=1.760) which is higher than the refractive index (of the order of 1.4 to 1.5) of various types of glass, so that, even if the transparent substrates 101 and 102 are thin, the aforementioned defocusing effect can be satisfactorily realized. In other words, if the transparent substrates are formed with thicknesses which are equal to that of a conventional transparent substrate, the defocusing effect can be increased. In addition, if it is sufficient to obtain a defocusing effect which is the same as that obtained in a conventional device, the transparent substrates used can be made thinner than a conventional transparent substrate.

The thermal conductivity of monocrystalline sapphire (which is 42.0 W/m·K) is considerably higher than that of quartz glass (which is 1.2 W/m K). Therefore, by using monocrystalline sapphire to form the transparent substrates 101 and 102 formed in correspondence with open sections 20b and 20c in a case member 20, the heat-dissipation capability of a liquid crystal 10 can be increased, making it possible to prevent overheating of the liquid crystal panel 10. Consequently, the strength of a cooling fan used to forcibly cool a liquid crystal light valve being a liquid crystal panel module used in a projection display device can be reduced, making it possible to reduce noise and the amount of electrical power consumed. In addition, since an increase in heat dissipation reduces the temperature distribution within a surface of the liquid crystal panel 10, the image quality can be increased.

When the liquid crystal panel module of the embodiment was installed as a light valve in the projection display device illustrated in FIG. 13, and operated, the rate of temperature rise was decreased by 10 to 15% compared to a conventional rate of temperature rise. In addition, the temperature distribution within a surface of the panel was reduced to ¼ to ⅕th of the conventional temperature distribution.

Although in the embodiment both of the transparent substrates 101 and 102 are formed of monocrystalline sapphire, they may each be formed, for example, by bonding a thin plate of monocrystalline sapphire onto the surface of various types of commonly used glass. In this case, from the point of view of heat dissipation and preventing breakage, it is preferable to dispose the monocrystalline sapphire at the outside surfaces of the transparent substrates 101 and 102. When this is done, it is possible to reduce the amount of monocrystalline sapphire used, which is highly effective in reducing manufacturing costs.

The transparent substrates 101 and 102 are formed by cutting a monocrystalline sapphire, formed by such a lifting method as the Bernoulli's method or the EFG (edge-defined film-fed growth) method, into a required shape, and, then, by polishing the resulting monocrystalline sapphire. The plate surfaces of the transparent substrates 101 and 102 are processed into mirror surfaces by mechanically and chemically polishing them. The thicknesses of the transparent substrates 101 and 102 are determined by the mechanism strength and material cost, and are, preferably, in the range of from 50 to 1000 µm. When the transparent substrates 101 and 102 are formed so that an R surface of monocrystalline sapphire is processed into a plate surface, it is easier to manufacture them. In addition, this is desirable from the points of view of obtaining sufficient hardness and satisfactory joining characteristics. In the embodiment, a light-shielding film, 102a may be formed on the outer periphery of one of the surfaces of the transparent substrate 102 opposing the opposing substrate 12. When the light-shielding film 4a and a light-shielding layer 12a formed on the liquid crystal layer side of the opposing substrate 12 are disposed so as to overlap each other as viewed in a plane, it is possible to prevent light leakage from a periphery to the liquid crystal layer.

One other distinctive feature of the embodiment is that a stepped surface 52 is formed in a portion of the case member 50 located in correspondence with the boundary between the opposing substrate 12 and the transparent substrates 102, and is brought into contact with the outside surface of the opposing substrate 12 in order to position the liquid crystal panel 10 in the thickness direction thereof. Similarly to above-described embodiments, the positioning of the liquid crystal panel 10 in a direction of a surface thereof is achieved by an inside surface 51.

Unlike in the above-described embodiments, since the liquid crystal panel is positioned in the thickness direction thereof by the stepped surface 52, the case member 50 does not need to be brought into contact with the inside surface of the protruding section 11a of the element substrate 11. Therefore, the stepped surface 52 does not need to be formed away from wiring, connecting terminals, a mounted integrated circuit chip, etc., formed on the inside surface of the protruding section 11a, thereby making it unnecessary to form the case member 50 into a complicated structure. In order to obtain similar effects, the outside surface of the element substrate 11 may be formed so that it contacts the stepped surface of the case member 50. In the embodiment, an open section 50d which opens downward in FIG. 10(b) is formed at a hole 50a in the case member 50, so that the liquid crystal panel 10 can be inserted from the open section 50d by sliding it in the direction of extension of the surface of the liquid crystal panel 10. With a flexible wiring substrate 16 shown in FIG. 10(b) being connected, the liquid crystal panel 10 is placed into the case member 50 from the open section 50d, and affixed to the case member 50 with an adhesive which is described later.

Ninth Embodiment

Figure 11:
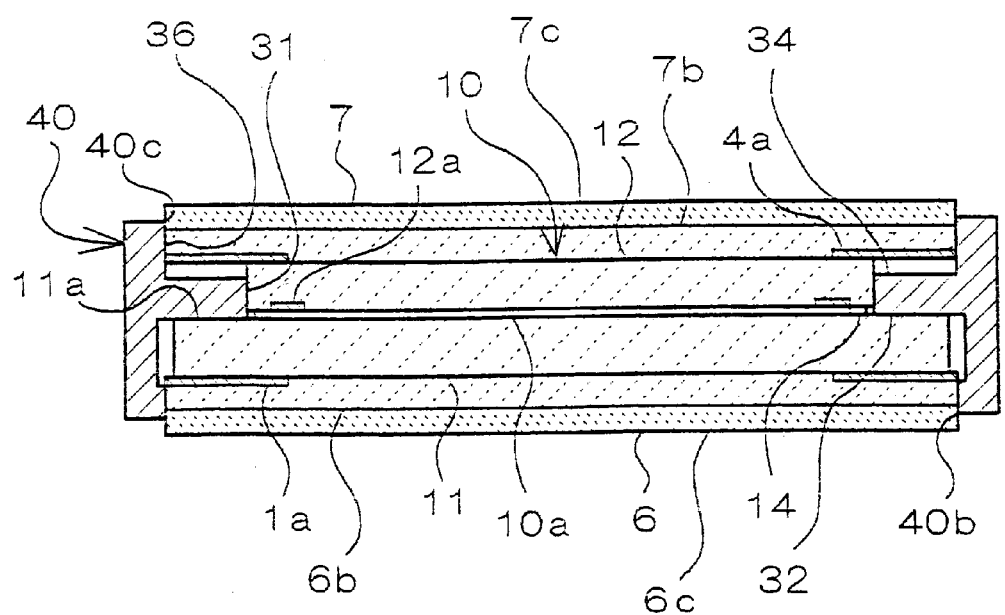
FIG. 11 is a sectional view schematically showing the structure of a ninth embodiment of the electro-optical device in accordance with the present invention.

A description of a ninth embodiment of the electro-optical device in accordance with the present invention will be given with reference to FIG. 11. FIG. 11 is a sectional view schematically showing the general structure of the ninth embodiment of the liquid crystal panel module. In this embodiment, a liquid crystal panel 10 is accommodated in a case member 40 which is almost the same type as that used in the seventh embodiment. Surfaces of transparent substrates 6 and 7 formed of glass are adhered to the surfaces of the liquid crystal panel 10. This embodiment is similar to the above-described embodiments in that edges defining open sections 40b and 40c formed in the case member 40 are disposed closer to the liquid crystal panel 10 than the outside surfaces of the transparent substrates 6 and 7. In the embodiment, the transparent substrate 6 has a layered structure in which a sapphire layer 6c formed of monocrystalline sapphire is affixed to a glass layer 6b. Similarly, the transparent substrate 7 also has a layered structure in which a sapphire layer 7c formed of monocrystalline sapphire is affixed to a glass layer 7b. For the glass layers 6b and 7b, inorganic glass with a suitable thickness of, for example, 0.7 mm and subjected to chemical strengthening by an ion-exchange method is used. The sapphire layers 6c and 7cused are formed so that their final thicknesses are in an order of 300 µm as a result of, for example, a polishing operation. The thicknesses of the sapphire layers are not limited to the aforementioned thickness, so that, from the point of view of obtaining mechanical strength and reducing material costs, it is actually preferable that the thicknesses lie in the range from 50 to 1000 µm. For example, a liquid adhesive or an epoxy adhesive in the form of a sheet may be used to bond the glass layers 6b and 7b and the sapphire layers 6c and 7c together. It is preferable that the adhesive used provides sufficient adhesive strength and does not reduce the light-transmittance ratio of the transparent substrates 6 and 7 (or is transparent even after hardening). Here, after bonding the glass layers and the sapphire layers, either the glass layers or the sapphire layers may be made thinner by polishing, or, for example, ends thereof may be processed after they are bonded together.

In the embodiment, surfaces of the transparent substrates 6 and 7 are bonded together to the liquid crystal panel 10 so that surfaces of the sapphire layers 6c and 7c become the outside surfaces. Since the sapphire layers are very hard as discussed above, scratch defects are not easily formed on the surfaces thereof, and function as excellent dust-protecting dements. in addition, since they have high thermal conductivity, they can increase the heat-dissipation capability of the liquid crystal panel 10. Monocrystalline sapphire has a refractive index ($n_o$=1.768, $n_e$=1.760) which is greater than the refractive index (of the order of 1.4 to 1.5) of various types of glass, so that, even if the transparent substrates 6 and 7 are thin, sufficient defocusing effect can be obtained.

In the embodiment, the transparent substrates 6 and 7 are constructed such that monocrystalline sapphire is bonded to a different transparent member, so that it is possible to prevent scratching and breakage to obtain sufficient defocusing effect, and to increase heat-dissipation capability, without using a large amount of expensive monocrystalline sapphire.

When the transparent substrates 6 and 7 each having a layered structure which may consist of a sapphire layer and a different transparent member are used, it is preferable, from the viewpoint of preventing scratching on the transparent members (such as glass), to form them so that the sapphire layers alone protrude out from the case, from the open sections 40b and 40c in the case member 40. In this embodiment, it is possible to prevent leakage of light from a periphery to a liquid crystal layer by disposing a light-shielding film 102a and a light-shielding layer 12a formed at the liquid crystal layer side of the opposing substrate 12 so that they overlap as viewed in a plane.

Tenth Embodiment

Figure 12:
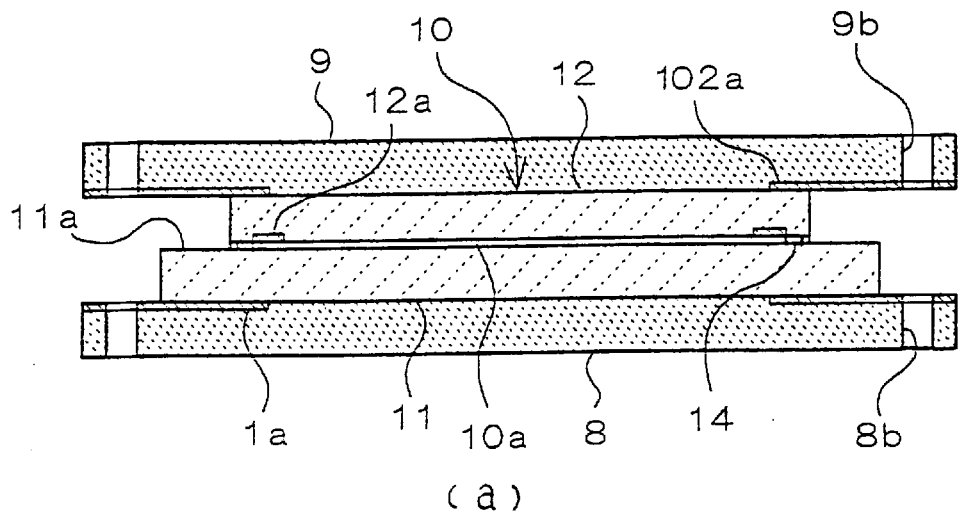
FIG. 12(a) is a sectional view schematically showing the structure of a tenth embodiment of the electro-optical device in accordance with the present invention.
FIG. 12(b) is a schematic plan view thereof.
Figure 12:
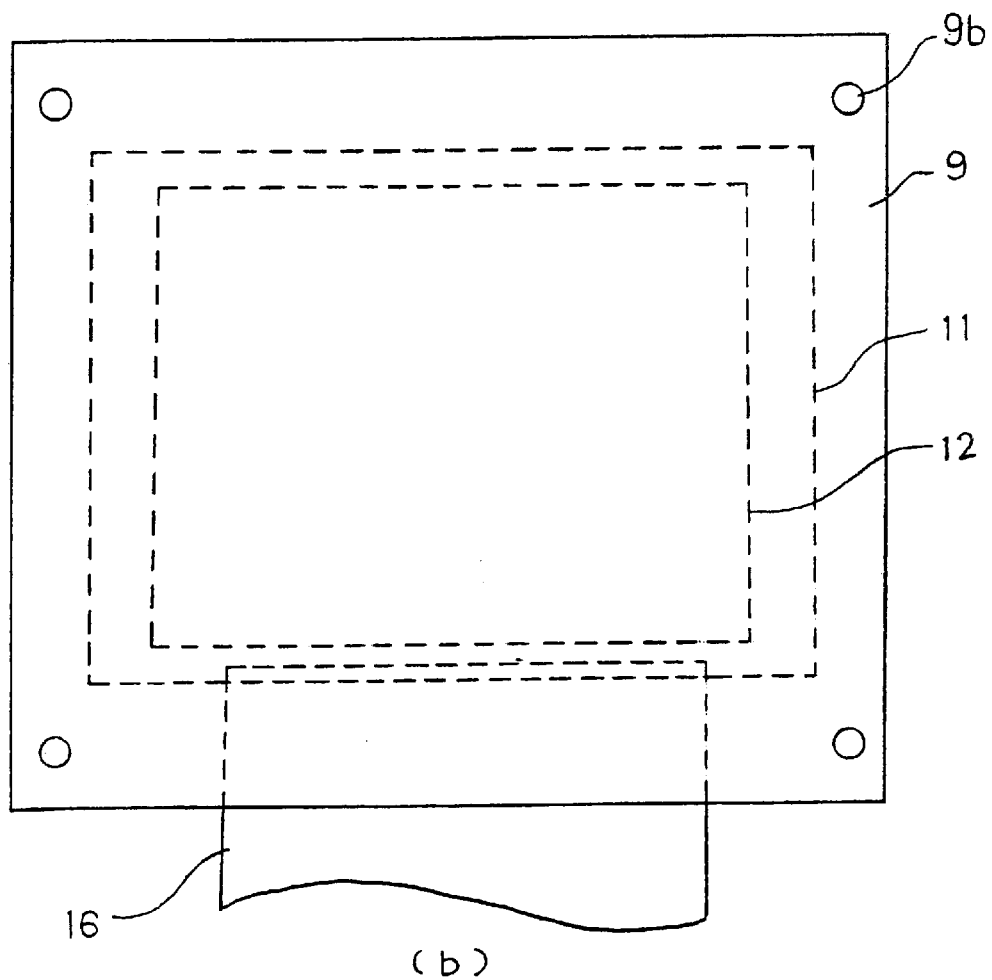

A description of a tenth embodiment of the present invention will be given with reference to FIGS. 12(a)–(b). FIG. 12(a) is a sectional view schematically showing the general structure of the tenth embodiment of the liquid crystal panel module which is an electro-optical device in accordance with the present invention, while FIG. 12(b) is a schematic plan view thereof. The structure used in this embodiment is similar to that used in the eighth embodiment, so that only the differences will be discussed. In the embodiment, the case members used in the above-described embodiments are not used. A mounting securing structure is formed in transparent substrates 8 and 9, themselves, whose surfaces are bonded to a liquid crystal panel 10, in order to mount the electro-optical device to the mounting portion inside the projection display device. The transparent substrates 8 and 9 have forms which are a size larger than the liquid crystal panel 10 as viewed in a plane, with the mounting structure, that is, mounting holes 8b and 9b serving as engaging portions to be secured to the inside of the projection display device, being formed in portions protruding outward from the periphery of the liquid crystal panel 10 so as to extend therethrough. The liquid crystal panel module shown in FIGS. 12(a) and (b) is affixed to the inside of the projection display device with, for example, a bolt inserted into the mounting holes 8b and 9b.

In the embodiment, since the transparent substrates 8 and 9, themselves, are used as a case member, so that the case members used in the above-described embodiments are not used, the thickness of the panel assembly, itself, can be made to become the thickness of the liquid crystal panel module, thereby making it possible to make the liquid crystal panel module thinner than a conventional liquid crystal panel module. Here, since the transparent substrates 8 and 9 are sufficiently hard, the probability with which the surfaces are scratched, broken, or cracked can be reduced. In addition, since the transparent substrates are a size larger than the electro-optical panel, even if any adhesive protrudes out from between the electro-optical panel and the transparent substrates, the protruding adhesive is covered by the transparent substrates, so that it is possible to prevent the adhesive from flowing out of the panel module. Further, due to an opening-like shape in a sectional direction of the panel, cooling performance is increased.

Instead of the through holes described above, key grooves, such as U-shaped grooves, slits, steps, and various other types of structures may be used as engaging portions in the mounting securing structure for setting the electro-optical device. They are formed in correspondence with the structure of the mounting portion side to be set. Further, although the entire transparent substrates 8 and 9 are formed of monocrystalline sapphire in the embodiment, they may each be formed by combining a sapphire layer and a different transparent material as in the ninth embodiment.

Monocrystalline sapphire used to form the transparent substrates may also be used to form portions extending beyond the liquid crystal panel 10.

An engaging portion may be formed in only one of the transparent substrates.

Although, in the above-described embodiment, the element substrate 1.1 and the opposing substrate 12 may be, for example, a quartz substrate or a glass substrate, at least one of the element substrate 11a and the opposing substrate 12 may be formed of monocrystalline sapphire in any one of the above-described embodiments. In such a case, the element substrate 11 or the opposing substrate 12, in addition to the transparent substrates, is formed of monocrystalline sapphire, so that the thermal conductivity is increased, causing the heat-dissipation capability of the electro-optical panel to be increased, and the temperature distribution within the surface of the electro-optical panel to be reduced. Therefore, this structure is effective in reducing deterioration of image quality caused by overheating and temperature distribution.

The present invention is not limited to the above-described electro-optical devices and the projection display device using the same.

In the embodiments, although the opposing substrate is made smaller than the element substrate, the opposing substrate may be made larger than the element substrate.

The monocrystalline sapphire used in the eighth and ninth embodiments may also be used in the other embodiments.

Obviously, other modifications may be made within the scope of the present invention or without departing from the gist of the present invention.

What is claimed is:

1. An electro-optical device comprising:
   an electro-optical panel including an opposing substrate and an element substrate having a larger area than the opposing substrate; and
   a case member including an open section at the opposing substrate and an open section at the element substrate, the case member accommodating the electro-optical panel from the open section at the element substrate, between the open section at the opposing substrate and the open section at the element substrate, the case member including a positioning section that accommodates the opposing substrate and contacts an edge of the element substrate.

2. The electro-optical device according to claim 1, the element substrate comprising:
   wiring formed on the edge thereof that contacts the positioning section; and
   a protective film formed on the wiring.

3. The electro-optical device according to claim 1, the positioning section of the case member being formed at a portion which contacts a corner of the element substrate.

4. The electro-optical device according to claim 1, an open section formed at the positioning section of the case member having a same shape as the opposing substrate of the electro-optical panel.

5. The electro-optical device according to claim 1, the electro-optical panel comprising a transparent member joined to at least one of the opposing substrate and the element substrate.

6. The electro-optical device according to claim 5, at least a portion of the transparent member being formed of monocrystalline sapphire.

7. The electro-optical device according to claim 5, the transparent member protruding from a side surface of the case member, with a peripheral edge of the protruding transparent member being covered with a light-shielding material.

8. The electro-optical device according to claim 1, further comprising a light-shielding material filled between the electro-optical panel and at least one of the open section at the opposing substrate and the open section at the element substrate in the case member.

9. The electro-optical device according to claim 1, further comprising a light-shielding member disposed at at least one of the opposing substrate and the element substrate.

10. The electro-optical device according to claim 9, the light-shielding member comprising a light-shielding section positioned in correspondence with an edge of the opposing substrate or the edge of the element substrate.

11. The electro-optical device according to claim 10, the light-shielding member comprising a transparent member, and the light-shielding section comprising a light-shielding layer formed on the transparent member.

12. The electro-optical device according to claim 10, the light-shielding member comprising a sheet including a light-transmissive section, and the light-shielding section surrounding the light-transmissive section.

13. The electro-optical device according to claim 10, the light-shielding member comprising a frame member.

14. The electro-optical device according to claim 1, the case member comprising a stepped section at the open section at the element substrate.

15. The electro-optical device according to claim 14, a size of a gap between the positioning section and the stepped section being wider than a thickness of the element substrate.

16. The electro-optical device according to claim 15, further comprising a transparent member joined to the element substrate, and a gap being formed between an inside surface of the case member and a periphery of a portion where the element substrate and the transparent member are joined together.

17. The electro-optical device according to claim 14, an open section at the stepped section of the case member having a same shape as the transparent member joined to the element substrate.

18. The electro-optical device according to claim 1, a thickness of the positioning section of the case member being smaller than a sum of a thickness of the opposing substrate and a size of a gap between the opposing substrate and the element substrate in the electro-optical panel.

19. The electro-optical device according to claim 18, further comprising a transparent member joined to the opposing substrate, and a gap being formed between an inside surface of the case member and a periphery of a portion where the opposing substrate and the transparent member are joined together.

20. The electro-optical device according to claim 1, the case member comprising a gripping member that grips the electro-optical panel.

21. The electro-optical device according to claim 20, the element substrate being gripped by the positioning section and the gripping member.

22. The electro-optical device according to claim 20, the gripping member being formed of a light-shielding material.

23. A projector comprising:
a light source; and
an electro-optical device that transmits illuminating light from the light source therethrough, the electro-optical device comprising:
an electro-optical panel including an opposing substrate and an element substrate having a larger area than the opposing substrate; and
a case member including an open section at the opposing substrate and an open section at the element substrate, the case member accommodating the electro-optical panel from the open section at the element substrate,
between the open section at the opposing substrate and the open section at the element substrate, the case member including a positioning section that accommodates the opposing substrate and contacts an edge of the element substrate,
the projector further comprising a projection lens system that projects an image from the electro-optical device.

24. An electro-optical device comprising:
an electro-optical panel including an opposing substrate and an element substrate having a larger area than the opposing substrate; and
a case member including an open section at the opposing substrate, an open section at the element substrate, and an opening for inserting the electro-optical panel in a direction perpendicular to the open section at the opposing substrate and the open section at the element substrate,
between the open section at the opposing substrate and the open section at the element substrate, the case member comprising a positioning section that accommodates the opposing substrate and contacts an edge of the element substrate.

25. The electro-optical device according to claim 24, further comprising a protruding section that overlaps the edge of the element substrate formed at the open section at the element substrate in the case member.

26. The electro-optical device according to claim 24, the electro-optical panel comprising a transparent member joined to at least one of the opposing substrate and the element substrate and at least partly formed of monocrystalline sapphire.

27. A projector comprising:
a light source; and
an electro-optical device that transmits illuminating light from the light source therethrough, the electro-optical device comprising:
an electro-optical panel including an opposing substrate and an element substrate having a larger area than the opposing substrate; and
a case member including an open section at the opposing substrate an open section at the element substrate, and an opening for inserting the electro-optical panel in a direction perpendicular to the open sections,
between the open section at the opposing substrate and the open section at the element substrate, the case member comprising a positioning section that accommodates the opposing substrate and contacts an edge of the element substrate,
the projector further comprising a projection lens system that projects an image from the electro-optical device.

28. An electro-optical device comprising:
an electro-optical panel including an opposing substrate, an element substrate having a larger area than the opposing substrate, and a transparent member joined to the opposing substrate and having a larger area than the opposing substrate; and
a case member including an open section at the opposing substrate, an open section at the element substrate,
between the open section at the opposing substrate and the open section at the element substrate, the case member comprising a protruding section sandwiched by an edge of the element substrate and an edge of the transparent member.

29. The electro-optical device according to claim 28, an open section formed at the protruding section having a same shape as the opposing substrate.

30. The electro-optical device according to claim 28, the transparent member joined to the opposing substrate protruding from the case member.

31. The electro-optical device according to claim 30, at least a portion of the transparent member being formed of monocrystalline sapphire.

32. A projector comprising:
a light source; and
an electro-optical device that passes illuminating light from the light source therethrough, the electro-optical device comprising:
an electro-optical panel including an opposing substrate, an element substrate having a larger area than the opposing substrate, and a transparent member joined to the opposing substrate and having a larger area than the opposing substrate; and
a case member including an open section at the opposing substrate and an open section at the element substrate,
between the open section at the opposing substrate and the open section at the element substrate, the case member comprising a protruding section sandwiched by an edge of the element substrate and an edge of the transparent member,
the projector further comprising a projection lens system that projects an image from the electro-optical device.

33. An electro-optical device comprising:
an electro-optical panel including an opposing substrate, an element substrate, and a transparent member joined to the opposing substrate and having a smaller area than the opposing substrate; and
a case member including an open section at the opposing substrate and another open section at the element substrate,
between the open section at the opposing substrate and the open section at the element substrate, the case member comprising a positioning section that contacts an edge of the opposing substrate.

34. The electro-optical device according to claim 33, the element substrate having a larger area than the opposing substrate.

35. The electro-optical device according to claim 34, the open section at the element substrate in the case member having formed thereat a protruding section formed so as to surround a peripheral edge of the element substrate.

36. The electro-optical device according to claim 33, the transparent member joined to the opposing substrate having a same shape as the open section at the opposing substrate.

37. The electro-optical device according to claim 33, the open section at the opposing substrate and the open section at the element substrate having a same shape.

38. The electro-optical device according to claim 33, at least a portion of the transparent member being formed of monocrystalline sapphire.

39. A projector comprising:
a light source; and
an electro-optical device that transmits illuminating light from the light source therethrough, the electro-optical device comprising:
an electro-optical panel including an opposing substrate, an element substrate, and a transparent member joined to the opposing substrate and having a smaller area than the opposing substrate; and
a case member including an open section at the opposing substrate and another open section at the element substrate,
between the open section at the opposing substrate and the open section at the element substrate, the case member comprising a positioning section that contacts an edge of the opposing substrate,
the projector further comprising a projection lens system that projects an image from the electro-optical device.

40. An electro-optical device comprising:
an electro-optical panel including an opposing substrate, an element substrate, and a transparent member joined to at least one of the opposing substrate and the element substrate and at least partly formed of monocrystalline sapphire; and
a case member including an open section at the opposing substrate and another open section at the element substrate,
the case member comprising a positioning section that accommodates the electro-optical panel and that contacts an edge of the electro-optical panel.

41. The electro-optical device according to claim 40, the edge of the electro-optical panel that contacts the positioning section corresponding to the element substrate.

42. The electro-optical device according to claim 40, the transparent member being a layered structure comprising a monocrystalline sapphire layer formed at an exposed surface and a layer formed of a material which is not monocrystalline sapphire.

43. The electro-optical device according to claim 40, the transparent member being formed of monocrystalline sapphire.

44. The electro-optical device according to claim 40, an outside surface of the transparent member protruding from a side surface of the case member.

45. A projector comprising:
a light source; and
an electro-optical device transmitting illuminating light from the light source therethrough, the electro-optical device comprising:
an electro-optical panel including an opposing substrate, an element substrate, and a transparent member joined to at least one of the opposing substrate and the element substrate and at least partly formed of monocrystalline sapphire; and
a case member including an open section at the opposing substrate and another open section at the element substrate,
the case member comprising a positioning edge that accommodates the electro-optical panel and contacts an edge of the electro-optical panel,
the projector further comprising a projection lens system that projects an image from the electro-optical device.

46. An electro-optical device comprising:

an electro-optical panel including a first substrate and a second substrate having a larger area than the first substrate; and a case member including an open section at the first substrate and an open section at the second substrate, the case member accommodating the electro-optical panel from the open section at the second substrate, between the open section at the first substrate and the open section at the second substrate, the case member comprising a positioning section that accommodates the first substrate and contacts an edge of the second substrate.

47. An electro-optical device comprising:

an electro-optical panel including a first substrate and a second substrate having a larger area than the first substrate; and a case member including an open section at the first substrate, an open section at the second substrate, and an opening for inserting the electro-optical panel in a direction perpendicular to the open section at the opposing substrate and the open section at the element substrate, between the open section at the first substrate and the open section at the second substrate, the case member comprising a positioning section that accommodates the first substrate and contacts an edge of the second substrate.

48. An electro-optical device comprising:

an electro-optical panel including a first substrate, a second substrate having a larger area than the first substrate, and a transparent member joined to the first substrate and having a larger area than the first substrate; and a case member including an open section at the first substrate and another open section at the second substrate, between the open section at the first substrate and the open section at the second substrate, the case member comprising a protruding section sandwiched by an edge of the second substrate and an edge of the transparent member.

49. An electro-optical device comprising:

an electro-optical panel including a first substrate, a second substrate, and a transparent member joined to the first substrate and having a smaller area than the first substrate; and a case member including an open section at a side of the first substrate and another open section at the second substrate, between the open section at the first substrate and the open section at the second substrate, the case member comprising a positioning section that contacts an edge of the first substrate.

50. An electro-optical device comprising:

electro-optical panel in which a first substrate and a second substrate are joined together so that an edge of the second substrate extends beyond an edge of the first substrate; and a case member including an open section at the first substrate and an open section at the second substrate, the case member accommodating the electro-optical panel from the open section at the second substrate, between the open section at the first substrate and the open section at the second substrate, the case member comprising a positioning section that accommodates the first substrate and contacts an edge of the second substrate.

51. An electro-optical device comprising:

an electro-optical panel in which a first substrate and a second substrate are joined together so that an edge of the second substrate extends beyond an edge of the first substrate; and a case member including an open section at the first substrate, an open section at the second substrate, and an opening for inserting the electro-optical panel in a direction perpendicular to the open sections, between the open section at the first substrate and the open section at the second substrate, the case member comprising a positioning section that accommodates the first substrate and contacts an edge of the second substrate.

52. A projector comprising:

a light source; and an electro-optical panel module that transmits illuminating light from the light source therethrough, the electro-optical panel module comprising:

an electro-optical panel including a first substrate and a second substrate;

a transparent member affixed to at least one of the first substrate and the second substrate, and including a protruding section which protrudes from an edge of at least the substrate to which the transparent member is affixed, the protruding section being formed of monocrystalline sapphire; and an engaging section, formed at the monocrystalline sapphire protruding section of the transparent member, secured to an inside of the projector, the projector further comprising a projection lens system that projects an image from the electro-optical panel module.

* * * * *